US012111712B2

(12) United States Patent
Thomas

(10) Patent No.: US 12,111,712 B2
(45) Date of Patent: Oct. 8, 2024

(54) METHODS AND APPARATUS TO DETECT PROXIMITY OF OBJECTS TO COMPUTING DEVICES USING NEAR ULTRASONIC SOUND WAVES

(71) Applicant: Intel Corporation, Santa Clara, CA (US)

(72) Inventor: Tigi Thomas, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 611 days.

(21) Appl. No.: 17/211,216

(22) Filed: Mar. 24, 2021

(65) Prior Publication Data

US 2021/0208664 A1 Jul. 8, 2021

(51) Int. Cl.
*A61K 35/12* (2015.01)
*G01S 15/14* (2006.01)
*G06F 1/3231* (2019.01)
*G06F 3/01* (2006.01)

(52) U.S. Cl.
CPC ............ *G06F 1/3231* (2013.01); *G01S 15/14* (2013.01); *G06F 3/017* (2013.01)

(58) Field of Classification Search
CPC ...... G06F 1/3231; G06F 3/017; G06F 1/1616; G06F 1/1684; G06F 1/1688; G01S 15/14; G01S 7/52004; G01S 7/524; G01S 15/04; G01S 15/101; G01S 15/88; Y02D 10/00
USPC .......................................................... 367/93
See application file for complete search history.

(56) References Cited

U.S. PATENT DOCUMENTS

| 5,436,580 | A | 7/1995 | Kellmann et al. |
| 6,367,020 | B1* | 4/2002 | Klein ...................... G06F 21/35 |
| | | | 726/28 |
| 6,542,436 | B1 | 4/2003 | Myllyla |
| 10,725,588 | B2 | 7/2020 | Thomas |
| 10,754,475 | B2 | 8/2020 | Thomas |
| 11,231,815 | B2* | 1/2022 | Munemoto ........... G06F 3/0416 |

(Continued)

OTHER PUBLICATIONS

European Patent Office, "Extended European Search Report," issued in connection with European Appl. No. 20156572.8, dated Oct. 29, 2020, 13 pages.

(Continued)

*Primary Examiner* — Tai T Nguyen
(74) *Attorney, Agent, or Firm* — Hanley, Flight & Zimmerman, LLC

(57) ABSTRACT

Methods and apparatus to detect proximity of objects to computing devices using near ultrasonic sound waves are disclosed. An example apparatus includes a frequency analyzer to determine power levels of noise in different frequency bands associated with sound waves sensed by a microphone of a computing device. The example apparatus further includes a signal generator to cause a speaker to produce a series of acoustic pulses. A central frequency of the pulses is defined based on the power levels of noise in the different frequency bands. The sound waves are sensed by the microphone to include the pulses and echoes of the pulses reflected off objects in a vicinity of the computing device. The example apparatus also includes an object detection analyzer to determine whether a first object is within an activation region associated with the computing device based on the pulses and the echoes sensed by the microphone.

24 Claims, 12 Drawing Sheets

(56) References Cited

U.S. PATENT DOCUMENTS

| | | |
|---|---|---|
| 2012/0313900 A1 | 12/2012 | Dahl |
| 2013/0009875 A1 | 1/2013 | Fry et al. |
| 2015/0085620 A1 | 3/2015 | Macours |
| 2016/0098076 A1 | 4/2016 | Chng et al. |
| 2017/0329928 A1 | 11/2017 | Song et al. |
| 2017/0371419 A1 | 12/2017 | Powell et al. |
| 2018/0160235 A1 | 6/2018 | Lesso et al. |
| 2018/0299546 A1 | 10/2018 | Suvanto |
| 2019/0187261 A1 | 1/2019 | Peso Parada et al. |
| 2019/0050061 A1* | 2/2019 | Børstad .................. G06F 3/017 |
| 2019/0220112 A1 | 7/2019 | Thomas |
| 2019/0277966 A1 | 9/2019 | Schoessler et al. |
| 2021/0048901 A1 | 2/2021 | Thomas |
| 2021/0208664 A1 | 7/2021 | Thomas |

OTHER PUBLICATIONS

European Patent Office, "Partial European Search Report," issued in connection with European Appl. No. 20156572.8, dated Jul. 29, 2020, 65 pages.

United States Patent and Trademark Office, "Notice of Allowance and Fee(s) Due," issued in connection with U.S. Appl. No. 16/363,315, dated Mar. 18, 2020, 8 pages.

United States Patent and Trademark Office, "Non-Final Office Action," issued in connection with U.S. Appl. No. 16/940,993, dated Dec. 7, 2022, 17 pages.

European Patent Office, "European Examination Report," issued in connection with European Appl. No. 20156572.8, dated May 27, 2022, 7 pages.

European Patent Office, "Extended European Search Report," issued in connection with European Appl. No. 19210054.3, dated Jun. 22, 2020, 10 pages.

United States Patent and Trademark Office, "Advisory Action," issued in connection with U.S. Appl. No. 16/230,908, dated Mar. 26, 2020, 3 pages.

United States Patent and Trademark Office, "Corrected Notice of Allowability," issued in connection with U.S. Appl. No. 16/230,908, dated Jul. 16, 2020, 2 pages.

United States Patent and Trademark Office, "Final Office Action," issued in connection with U.S. Appl. No. 16/230,908, dated Jan. 23, 2020, 24 pages.

United States Patent and Trademark Office, "Non-Final Office Action," issued in connection with U.S. Appl. No. 16/230,908, dated Nov. 22, 2019, 17 pages.

United States Patent and Trademark Office, "Notice of Allowance and Fee(s) Due," issued in connection with U.S. Appl. No. 16/230,908, dated Apr. 27, 2020, 10 pages.

United States Patent and Trademark Office, "Non-Final Office Action," issued in connection with U.S. Appl. No. 16/940,993, dated Jun. 8, 2023, 24 pages.

United States Patent and Trademark Office, "Notice of Allowance and Fee(s) Due," issued in connection with U.S. Appl. No. 16/940,993, mailed on Oct. 2, 2023, 6 pages.

* cited by examiner

| Noise Type | Proximity Sensing Accuracy | Power Saving Percentage (%) | System Deadlock? |
|---|---|---|---|
| No Noise (Silent Room) | 100% | 80% | No |
| Natural Talking | 100% | 80% | No |
| Calm Music | 98% | 80% | No |
| Loud Pop Music | 98% | 60% | No |
| Beating on Metal surface | 98% | 80% | No |
| Beating on Wood Surface | 98% | 80% | No |
| Hiss sound | 93% | 40% | No |
| -30dB White Noise | 93% | 20% | No |
| 0dB White Noise (Highest Noise level) | 90% | 0% | No |

METHODS AND APPARATUS TO DETECT PROXIMITY OF OBJECTS TO COMPUTING DEVICES USING NEAR ULTRASONIC SOUND WAVES

FIELD OF THE DISCLOSURE

This disclosure relates generally to proximity sensing, and, more particularly, to methods and apparatus to detect proximity of objects to computing devices using near ultrasonic sound waves.

BACKGROUND

There are a number of different human-machine interfaces that enable people to interact with a computing device. Some example human-machine interfaces include a keyboard or keypad, a mouse or other pointing device, a touchscreen, etc. Other techniques have been developed that do not require a person to physically touch the device such as, for example, through voice commands and/or based on detecting of the proximity and/or gestures of a user near the device.

Figure 1:
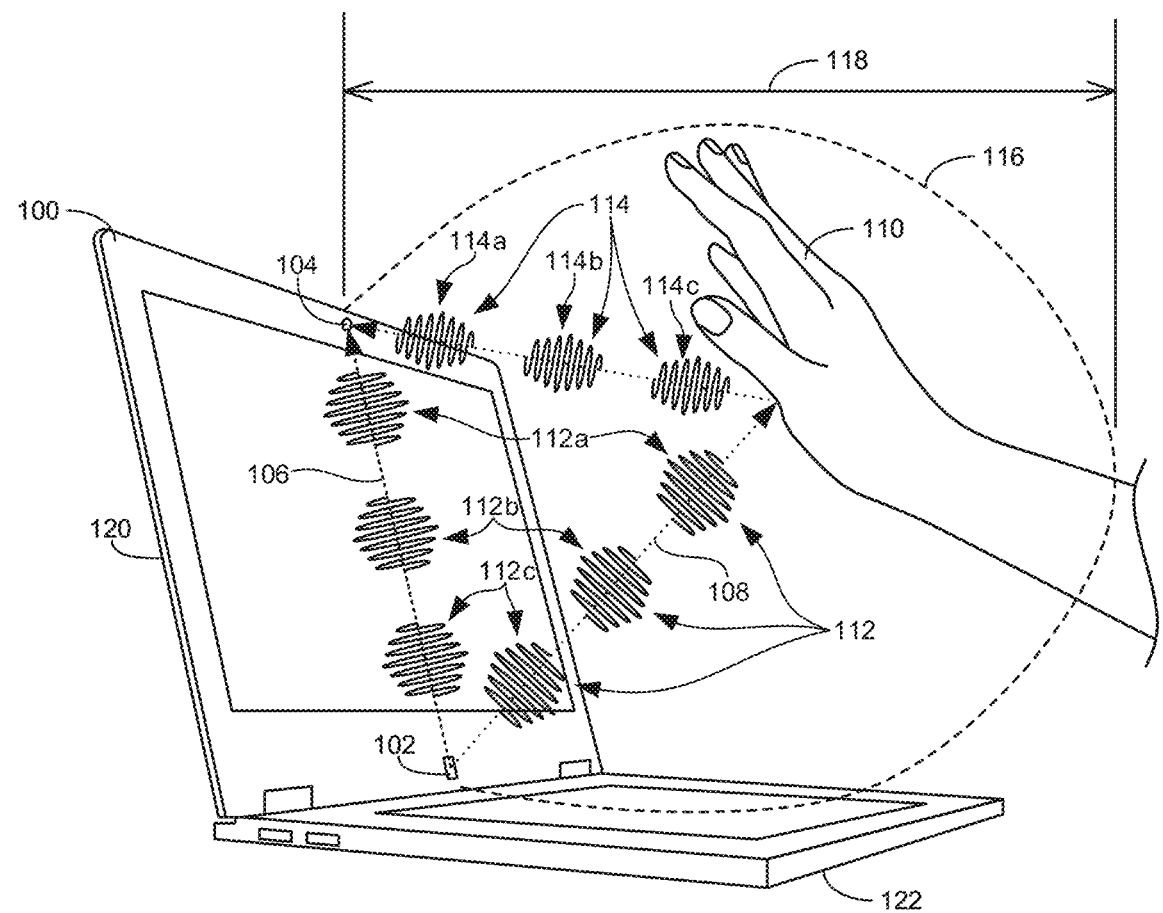
FIG. 1 illustrates an example computing device implemented in accordance with teachings disclosed herein.

The figures are not necessarily to scale. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "substantially real time" refers to occurrence in a near instantaneous manner recognizing there may be real world delays for computing time, transmission, etc. Thus, unless otherwise specified, "substantially real time" refers to real time+/−1 second.

DETAILED DESCRIPTION

There are a variety of techniques that may be implemented by a computing device to identify and/or detect an object in proximity to the computing device. In some instances, infrared (IR) depth sensors may be employed. However, many existing computing devices do not include IR depth sensors, thus, limiting the applicability of such approaches and/or imposing increased costs to the development and manufacture of new devices that include the additional components to implement this technique. Further, the effective range of detection possible by IR sensors is relatively limited. Further still, processing IR sensor data is relatively computationally intensive, thereby requiring increased computational capacity and a corresponding increase in power capacity relative to devices that do not implement IR sensors.

A second technique to detect the proximity of objects includes the processing of images captured by a camera. Image processing for object detection is computationally intensive. Indeed, many image processing applications implement dedicated hardware (e.g., a specialized image processor) to improve efficiencies in the heavy computations involved. Therefore, as with IR sensors, there are significant costs to include the components needed for effective image sensing. Furthermore, the relatively high computational burdens associated with image processing result in relatively significant power requirements.

A third approach to detecting proximity of objects is based on high bandwidth ultrasonic technologies. Such techniques involve specialized speakers, microphones, and/or or associated circuitry that are not implemented in many known computing devices. For example, traditional speakers and microphones for mobile devices (e.g., laptops, tablets, smartphones, etc.) support only 48 KHz and/or 44.1 KHz sampling frequencies. However, some high bandwidth ultrasonic technologies employ sensors with high bandwidth (e.g., greater than 96 kHz) CODECs (e.g., a speaker driving circuit) in the excitation path. Further, the sound capturing microphone and associated driving circuit also need to support high bandwidths beyond what is traditionally implemented in many existing computing devices. Therefore, there are increased costs in manufacturing devices capable of implementing such techniques because additional and/or more expensive components are required. Further, the higher bandwidths associated with such techniques produce more data to be analyzed, thereby resulting in increased computational burdens and associated increases in power requirements.

One particular application for object proximity detection enables a user of a computing device to cause the device to perform or initiate some action on the computing device without the user having to specifically touch the device. An example action might be to wake up the device from a sleep or idle state (e.g., a low power state) to an active (e.g., a full power) state. As mentioned above, IR depth sensing techniques, image processing techniques, and high bandwidth ultrasonic sensing techniques require relatively significant amounts of power such that they are unsuitable for implementation in a low power state (e.g., a sleep state or idle state), particularly for mobile computing devices that rely on a battery for power.

Examples disclosed herein overcome the limitations of the above approaches by implementing a methodology that does not require any specialized components. Rather, examples disclosed herein may be implemented using typical speakers and microphones (that support 48 KHz/44.1 KHz sampling frequencies) commonly found in the vast majority of mobile devices and other computing devices that exist today. As a result, examples disclosed herein do not result in any additional costs to manufacture the devices that may implement the disclosed examples. Furthermore, the computational burden of examples disclosed herein is relatively small such that specialized processing components are not required. Further, the power requirements for examples disclosed herein are sufficiently low to enable implementation when the computing device is in a low power or idle state (e.g., a sleep state). That is, examples disclosed herein may be implemented when a computing device is in a lower power state (e.g., in a sleep state) than when the device is in a fully active state to wake up the device from the lower power state to the fully active state.

Detecting the proximity of an object (e.g., a user) to a computing device to wake up the device is only one of many possible applications of the near ultrasonic proximity detection disclosed herein. Other example uses and/or applications of such technology include the detection of the presence (or absence) of a user, the detection and/or recognition of particular user gestures (e.g., hand gestures) and/or the tracking of the movement of hands or other parts of the user (or an object manipulated by the user), the detection of a user approaching (independent of any particular gesture performed in front of the device), and so forth.

Examples disclosed herein detect the presence and/or proximity of objects near a computing device based on near ultrasonic sound waves. Ultrasonic sound waves are sound waves with frequencies higher than the upper limit of the frequency ranges for sound that is audible to humans. While the upper limit of audible sound waves varies from person to person, the limit for most people is around 20 kilohertz (kHz). As used herein, near ultrasonic sound waves refer to sound waves within a region that is close to the upper limit of human hearing. More specifically, as used herein, near ultrasonic sound waves are sound waves having a frequency between 14 kHz and 24 KHz. By contrast, known high bandwidth ultrasonic sensing techniques mentioned above are typically implemented at frequencies well above the human limit of hearing (e.g., at frequencies above 40 kHz). Existing ultrasonic techniques operate at such high frequencies because operating in the near ultrasonic range (e.g., between 14 kHz and 24 kHz) has presented significant challenges due to noise in the environment. That is, while many devices already include speakers and microphones capable of operating in the near ultrasonic frequency range, the noise that is picked up by microphones in this range has made it difficult to reliably identify relevant signals needed for accurate sensing. As described below, examples disclosed herein enable the identification and/or isolation of relevant signals within the near ultrasonic frequency range from among other noises that may be in the environment to allow for accurate and reliable object detection. Further, the processing of such signals is accomplished in a computationally and power efficient manner that is suitable for implementation in an "always on" mode (e.g., operates even when the corresponding computing device is in a low power sleep state). As a result, examples disclosed herein may be used to detect the presence of an object (e.g., a user's hand) in the vicinity of a computing device in an idle state to trigger the device to wake up to a full power active state. Of course, examples disclosed herein may also be used when a computing device is in a fully active state to detect the proximity of objects for other purposes.

In some examples, a speaker on a computing device is caused to generate short acoustic pulses of near ultrasonic sound waves. A microphone on the computing device captures these acoustic pulses and also captures echoes of these acoustic pulses reflected off objects in the vicinity of the computing device. In examples disclosed herein, the computing device compares the time delay between an acoustic pulse detected directly from the speaker (a reference signal) relative to the detection of the acoustic pulse reflected off an object (an echo) to determine a distance of the object. In some examples, an echo from a user intending to cause an operation on the computing device (e.g., wake up) is isolated and/or identified relative to echoes from other objects nearby the computing device by comparing the captured echoes to an environment echo profile for the environment surrounding the computing device. In this manner, the presence of a user performing a particular gesture in front of the computing device can be detected with a relatively high degree of accuracy using relatively little power.

In many environments where computing devices are often used, most noise is at frequencies less than 14 kHz. As such, under most circumstances, the acoustic pulses generated by the speaker in the near ultrasonic range (e.g., between 14 kHz and 24 kHz) in disclosed examples can be reliably recognized. However, the frequency spectrum of noise in any given environment is likely to change over time with certain times being louder than others and/or having more spectral power at higher frequencies above 14 kHz (e.g., in the near ultrasonic frequency). However, in such situations it is common for such higher frequency noise to be concentrated in particular frequency bands rather than evenly spread across the entire near ultrasonic frequency range. Accordingly, in some examples, the acoustic pulses generated by the speaker are excited at a frequency that avoids the frequency bands associated with surrounding noise currently exhibiting the highest power levels. Thus, in some examples, the frequency of the acoustic pulses may change from one frequency to a different frequency in response to changes in the amount of power of surrounding noise to improve the detectability of the acoustic pulses and their associated echoes.

Further, in some examples, the amplitude of the excitation signal used to generate the acoustic pulse may be adjusted in response to detected changes in the surrounding noise to reduce power consumption. For instance, to reliably identify the acoustic pulses and the associated echoes in a noisy environment, it is advantageous to set the power of the acoustic pulses to be a certain threshold higher than the surrounding noise. Any increase in the power of the acoustic pulses beyond this threshold is unnecessary. Accordingly, when the noise at the particular frequency at which the acoustic pulse is excited is relatively low, the amplitude of the excitation signal and the corresponding power of the acoustic pulse may be lowered to conserve power while still being maintained a threshold amount above the power level of the noise to enable accurate detection.

FIG. 1 illustrates an example computing device 100 implemented in accordance with teachings disclosed herein. The example computing device 100 includes a speaker 102 and a microphone 104. In the illustrated example, the computing device 100 is shown as a laptop computer. However, the computing device 100 may be any type of computing device (e.g., a desktop computer, a tablet, a smartphone, etc.) that includes both the speaker 102 and the microphone 104. The speaker 100 and the microphone 10 may be standard components that are built into the originally manufactured device. Although only one speaker 102 and one microphone 104 are shown, teachings disclosed herein may be implemented by a device that includes more than one speaker and/or more than one microphone.

The speaker 102 may emit or produce sound waves that propagate in the environment surrounding the computing device 100. In some examples, such acoustic signals may be detected by the microphone 104. More particularly, such acoustic signals may follow a direct signal path 106 in which the signals are sensed directly by the microphone 104. Additionally or alternatively, the signals may follow an indirect or echo signal path 108 in which the soundwaves of the signals reflect off objects in the vicinity of the computing device 100 as an echo of the initial sound wave that is then sensed by the microphone 104. In the illustrated example, the echo signal path 108 is shown as reflected off a hand 110 of a user. However, the same acoustic signals may also reflect off other objects in the vicinity of the device 100 that are not represented in the illustrated example of FIG. 1. For example, the same acoustic signals produced by the speaker 102 may also reflect off the user's arm and/or other parts of the user's body (e.g., torso, face, etc.), with such echoes being sensed by the microphone 104. Further, the same acoustic signals may reflect as an echo off of furniture (e.g., a desk, a chair, etc.), walls, ceilings, and/or any other object(s) within the vicinity of the computing device 100.

For purposes of explanation, small waveforms are shown on each of the direct and echo signal paths 106, 108 to represent individual acoustic pulses (individually identified by reference numerals 112a-c and generically identified by reference numeral 112) generated in series by the speaker 102 at controlled (e.g., fixed) intervals. While separate waveforms are shown on both the direct signal path 106 and the echo signal path 108, corresponding ones of the waveforms on both paths 106, 108 are associated with the same acoustic pulses 112a-c. That is, the two waveforms identified by reference numeral 112a correspond to a single first acoustic pulse 112a (i.e., both are generated from a single excitation of the speaker 102 at a single point in time). Similarly, the two waveforms identified by reference numeral 112b correspond to a single second acoustic pulse 112b generated a period of time after the first acoustic pulse 112a. Further, the two waveforms identified by reference numeral 112c correspond to a single third acoustic pulse 112c generated a period of time after the second acoustic pulse 112b.

The illustrated example of FIG. 1 also includes additional waveforms along the echo signal path 108 after being reflected off the user's hand 110 to represent echoes 114a, 114b, 114c (generically identified by reference numeral 114) associated with additional acoustic pulses 112 generated before the first acoustic pulse 112a. The waveforms corresponding to the echoes 114a, 114b, 114c do not have a corresponding waveform shown on the direct signal path 106 in FIG. 1 because the associated acoustic pulses 112 have already reached the microphone 104 at the time represented in the illustrated example. That is, as shown in the illustrated example, the direct signal path 106 is shorter than the echo signal path 108 such that the microphone 104 will sense an acoustic pulse 112 propagating along the direct signal path 106 before sensing echoes 114 corresponding to the same acoustic pulse 112 propagating along the echo signal path 108. The time delay between when an acoustic pulse 112 is sensed directly by the microphone 104 and when an echo 114 of the same acoustic pulse 112 is sensed by the microphone 104 after reflecting off an object is proportional to the distance of the of the object from the computing device 100.

The waveforms representative of the echoes 114 in FIG. 1 are shown as being smaller (e.g., having less amplitude or power) than the first, second, and third acoustic pulses 112a, 112b, 112c because objects do not perfectly reflect acoustic pulses. Rather, some power in the incident signal is lost when it is reflected as an echo. Furthermore, the strength of an echo is proportional to the size of the obstacle from which the echo is reflected. Another factor affecting the strength of an echo is the distance of the object. More particularly, the strength of an echo is inversely proportional to the distance of the object from the original source of the acoustic pulse (e.g., the speaker 102). The time delay between the detecting of acoustic pulses 112 (via the direct signal path 106) and the detecting of corresponding echoes 114 in conjunction with the strength of the echoes 114 is used herein to identify the presence and/or proximity of an object (e.g., the user's hand 110) to the computing device 100. The acoustic pulses 112 sensed directly by the microphone 104 (via the direct signal path 106) are referred to herein as reference signals because they serve as reference points to which subsequently detected echoes 114 are compared to determine distance information indicative of the proximity or distance of objects (e.g., the user's hand 110) to the computing device 100.

In some examples, the acoustic pulses 112 are generated at a fixed interval. The fixed interval establishes a consistent periodicity for the acoustic pulses 112 to enable reliable identification of the acoustic pulses 112 as they are sensed by the microphone 104 (as reference signals) after propagating along the direct signal path 106. More particularly, because the distance between the speaker 102 and the microphone 104 is fixed, the time for an acoustic pulse 112 to travel along the direct signal path 106 from the speaker 102 and be detected by microphone 104 as a reference signal is also fixed. Therefore, the interval between subsequent reference signals detected by the microphone 104 will match the fixed interval between the acoustic pulses 112 as produced by the speaker 102. In some examples, the fixed interval changes depending on whether the system is operating in a standby (lower power mode) or an active (higher power) mode. For instance, in some examples, the acoustic pulses 112 are generated by the speaker 102 at intervals of 125 milliseconds (or eight times a second) during the active mode and at intervals of 500 milliseconds (or twice a second) during the standby mode. In some examples, the fixed periodicity of the acoustic pulses 112 during the active mode may be more or less than 125 milliseconds (e.g., as often as every 50 milliseconds (or more) for 20 pulses each second). Likewise, the fixed periodicity of the acoustic pulses 112 during the standby mode may be more or less than 500 milliseconds. Regardless of the particular interval between successive acoustic pulses 112 in each of the standby mode and active mode, the active mode is associated with a shorter interval than the standby mode. The shorter period or interval during the active mode serves to increase the accuracy and/or precision of the object detection process while the longer period or interval during the standby mode serves to reduce power consumption of the process. Although the active mode consumes more power than the standby mode because the speaker 102 is excited more frequently, as described more fully below, even the active mode is relatively power efficient because the duration of each individual acoustic pulse 112 is less than 1 millisecond (e.g., approximately 400 microseconds). Assuming a pulse duration of 400 microseconds with a repetition period of 125 milliseconds (during the active mode), the total amount of time the speaker 102 is excited each second is just over 3 milliseconds (e.g., 3.2 ms). Therefore, even during the active mode, the speaker 102 is actively producing acoustic pulses 112 less than 1 percent of the time such that relatively little power is consumed. In some examples, the interval between pulses 112 may be the same in both active and standby modes.

Additionally, as discussed further below, in some examples, the power envelope of each acoustic pulse 112 is dynamically adjusted in response to the amount of noise detected in the surrounding environment to further reduce power consumption. For instance, when the noise is relatively high, the speaker 102 may be excited at full power to increase (e.g., maximize) the power envelope of the acoustic pulses 112 and associated echoes 114 can be recognized for proximity detection purposes. However, if the amount of noise decreases, the power envelope of the acoustic pulses 112 may be reduced to save power while being maintained a threshold level above the noise to still enable their reliable detection.

In some examples, in addition to the fixed periodicity, each successive acoustic pulse 112 is generated with a central frequency corresponding to near ultrasonic sound waves (e.g., in the range of 14 kHz to 24 kHz). For instance, in some examples, the acoustic pulses 112 are centered at approximately 22 kHz. In other examples, the central or nominal frequency may be lower than 22 kHz (e.g., 20 kHz) but at least above 14 kHz. In other examples, the central frequency of the acoustic pulses 112 may be higher than 22 kHz (e.g., 23 kHz) but no greater than 24 kHz to ensure that the acoustic pulses 112 can be reliably captured by existing microphones used in many computing devices today. In some examples, as discussed in further detail below, the central frequency of successive ones of the acoustic pulses 112 is dynamically adjusted in response to the amount of noise detected in the surrounding environment. Specifically, in some examples, a central frequency for the acoustic pulses is selected to be within a particular frequency band within the near ultrasonic frequency range in which the amount of noise is lower than the amount of noise in other frequencies bands within the near ultrasonic range. For example, if the amount (e.g., power level) of noise in the 16 kHz to 18 KHz frequency band is higher than in the 18 kHz to 20 KHz frequency band, then the speaker 102 may generate acoustic pulses 112 with a central frequency somewhere within the 18 kHz to 20 KHz frequency band (e.g., a central frequency of 19 kHz). Selecting a frequency band associated with lower levels of background noise enables more reliable detection of the acoustic pulses for proximity detection purposes. Further, selecting a frequency range associated with lower levels of noise enables the power envelope of the acoustic pulses 112 to be reduced while still being detectable, thereby further improving the power efficiency of the system.

In some examples, more than one frequency band within the near ultrasonic frequency range may have similar levels of noise that are lower than in other frequency bands. In such situations, the central frequency of the acoustic pulses 112 may periodically switch or hop between the different low-noise frequency bands. Switching between different frequencies periodically in this manner can significantly reduce the standing wave effect, which can deleteriously impact the accuracy of detection of the acoustic pulses 112 and the associated echoes 114.

In some examples, the acoustic pulses 112 are defined by a particular shape and power level so that the pulses remain substantially inaudible to humans. More particularly, in some examples, the acoustic pulses are shaped with sufficient ramp up time and ramp down time so that the pulses remain inaudible to humans. In some examples, the basic shape of the acoustic pulses 112 is defined by Equation 1:

$$x[n] = A \sin(2\pi(f/(Fs))n) \qquad \text{Eq. 1}$$

where f is the excitation frequency that is centered within the near ultrasonic frequency range between 14 kHz and 24 kHz (and may be dynamically changed in response to changes in noise levels at different frequencies as mentioned above): Fs is the sampling frequency that corresponds to the sampling frequency supported by the microphone 104 (e.g., 48 kHz sampling frequency); n corresponds to the sample number along the signal length (N) that may be represented by any number of samples based on the sampling frequency and duration of the sample: and A is the amplitude that may have a value ranging from between 0.001 and 1 (and may be dynamically adjusted in response to changes in the noise levels as mentioned above). Further, the shape and generation of the acoustic pulses 112 is defined by an auto-correlation smoothing and a scaling factor defined as follows:

$$x1[n] = x[n] \otimes x[n] \qquad \text{Eq. 2}$$

$$\text{ScaleFactor} = \text{Max}(x1[n])/2 \qquad \text{Eq. 3}$$

A final pulse value at sample n in each acoustic pulse 112 may be defined by dividing Equation 2 by Equation 3:

$$y[n] = x1[n]/\text{ScaleFactor} \qquad \text{Eq. 4}$$

While the acoustic pulses 112 generated by the speaker 102 have a consistent form and are produced at a consistent periodicity, the resulting echoes 114 corresponding to different ones of the pulses 112 do not necessarily have a consistent form (e.g., intensity) and may not be detected at consistent time intervals. Variation between different echoes 114 arises from the nature (e.g., size, shape, and material) of the objects off which the acoustic pulses 112 reflect and the distance of such objects from the speaker 102. For example, echoes 114 reflecting off a distant object will be weaker and arrive at a later point in time than echoes 114 reflecting off a closer object. In some examples, the variations in time and/or intensity of the echoes 114 detected by the microphone 104 are compared against the consistent acoustic pulses 112 detected by the microphone 104 to determine the presence and/or proximity of objects in the vicinity of the computing device 100.

In some examples, the proximity detection system of the computing device 100 is designed to detect when an object (e.g., the user's hand 110) is within an activation region 116 associated with the computing device 100. In some examples, the activation region 116 corresponds to an area within a threshold distance 118 of the computing device 100. The threshold distance 118 may be any suitable distance (e.g., 6 inches, 12 inches, 18 inches, 2 feet, 3 feet, etc.). In some examples, the activation region 116 is defined relative to a particular portion of the computing device 100. For instance, in the illustrated example of FIG. 1, the computing device 100 is represented as a laptop with a lid 120 that is moveable about a hinge relative to a base 122. In some such examples, the activation region 116 and the associated effectiveness of the system in detecting objects in proximity to the computing device 100 depends on the angle of lid 120 relative to the base 122. Typically, a laptop is opened with the lid 120 at an angle of between 70° and 110° relative to the base 122. Testing has shown that the accuracy of the object detection methodologies disclosed herein are greater than 95% when the lid is positioned at angles between 70° and 110°. While the accuracy may drop some at angles less than 70° (e.g., 80% accuracy at 50°) or more than 110° (e.g., 60% accuracy at 130°). These accuracies are merely representative of the particular laptop used for testing and differing results may be obtained for different laptops (e.g., with microphones and/or speakers positioned at different locations) and/or for other types of computing devices (e.g., desktop computers, tablets, smartphones, etc.). Further, the accuracy may vary depending on how a user holds an object (e.g., a hand) in front of the computing device 100. For instance, a laptop with the lid 120 opened a full 180° relative to the base 122 (similar to a tablet facing up) may still accurately detect a hand of user if the user places the hand directly above the laptop (rather than in front of the laptop as shown in FIG. 1).

If an object is detected within the activation region 116 (e.g., the object is within the threshold distance 118), the computing device 100 may activate or initiate an operation that is associated with a detected object. In some examples, the operation triggered by an object being detected within the activation region 116 includes waking up the computing device 100 from a low powered sleep state or idle state to a full powered active state.

A challenge to identifying a particular object (e.g., the user's hand 110) in the vicinity of the computing device 100 arises from the fact that the microphone 104 is likely to detect many other echoes 114 reflected off other objects in the surrounding environment of computing device 100. Furthermore, independent of the echoes 114 corresponding to the acoustic pulses 112, the environment may contain many other sources of noise (e.g., machines, people, etc.) that may also be detected by the microphone 104. Such environmental noises may supersede and/or mimic the acoustic pulses 112 and/or the echoes 114 resulting in errors in detecting an intended object such as, for example, the user's hand 110. Errors may be false negatives (in which an object in the activation region 116 is not detected) or false positives (in which an object is detected in the activation region 116 when no object is actually present). Of the two types of errors, false positives are more problematic because a false positive will trigger the operation of the computing device 100 when the user did not intend such operation to occur. Accordingly, examples disclosed herein are designed to reduce (e.g., minimize) the likelihood of a false positive occurring.

Noise is a significant challenge in the near ultrasonic frequency range (e.g., between 14 kHz and 24 kHz) because there are many sources (e.g., humans, machines, etc.) in everyday environments that produce noises in that range. This is a primary reason why known sound wave based proximity detection systems are typically implemented at much higher, ultrasonic frequencies (e.g., above 40 kHz). However, as mentioned above, such techniques come at increased cost and complexity due to the need for specialized components capable of handling the high frequencies.

Figure 2:
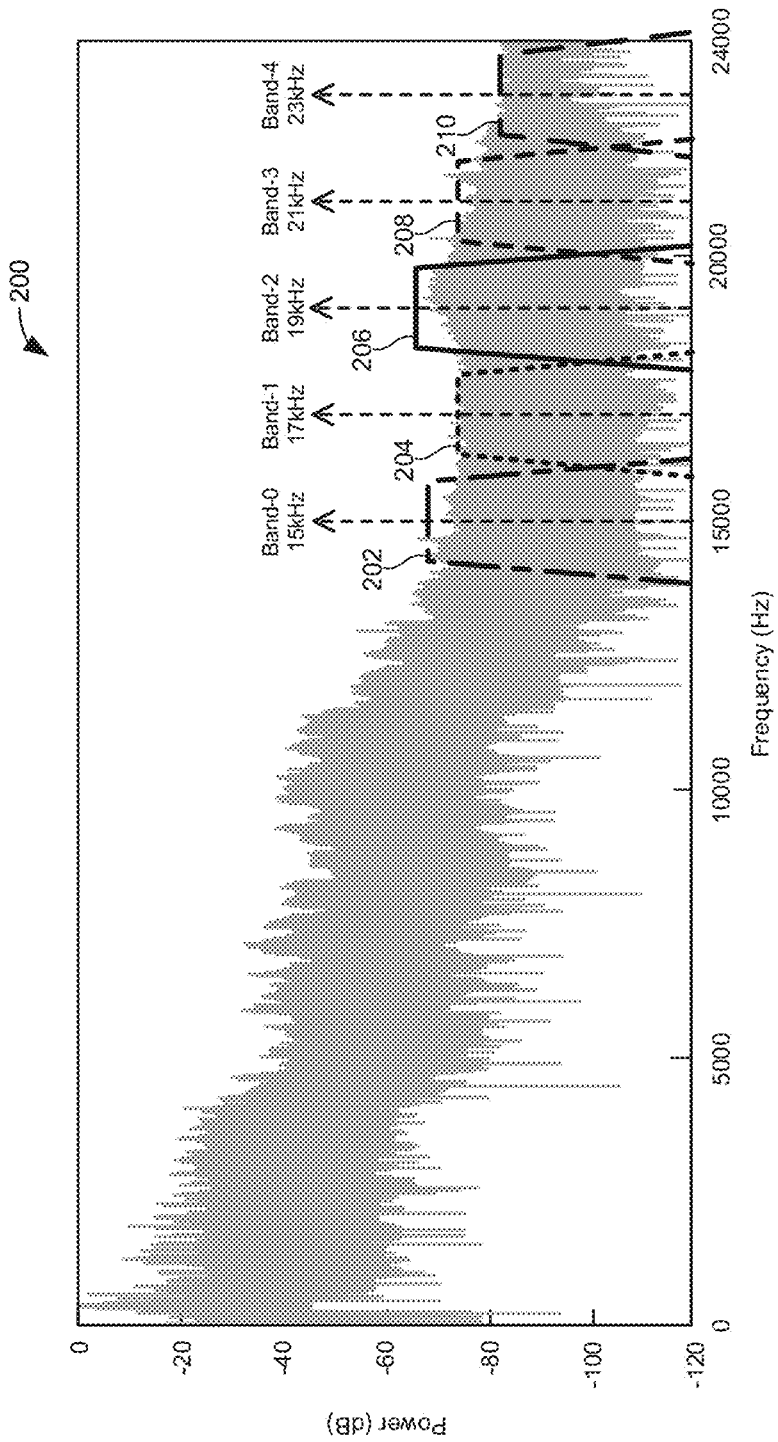
FIG. 2 illustrates an example frequency spectrum observed in a relatively loud room with the noise power level in different frequency bands represented.

While a relatively large amount of noise is produced in the near ultrasonic range, the level of noise in this range is still significantly less than the amount of noise at frequencies lower than 14 kHz. For instance, FIG. 2 illustrates an example frequency spectrum 200 observed in a relatively loud room. In FIG. 2, the vertical axis represents volume measured in signal intensity normalized to 1. More particularly, the intensity or power of a signal is calculated as 20 log(Vin/Vref), where Vref is a reference volume corresponding to a loudest expected volume. Thus, in FIG. 2, when Vin=Vref (corresponding to the loudest expected volume), the signal intensity is represented as 0 dB: when Vin=Vref/ 10, the signal intensity is represented as −20 dB: when Vin=Vref/100, the signal intensity is represented as −40 dB: and so forth. As shown in the illustrated example, the power of noise up to around 4 kHz is about −40 dB to −50 dB but drops to about −80 dB to −90 dB at frequencies above 14 kHz. The amount of noise in the near ultrasonic range would be even lower (e.g., between −100 dB and −120 dB) in a quiet room. Furthermore, noise in the near ultrasonic frequency range is typically temporary or dynamic in nature with the noise being greater within particular frequency bands at any given point in time rather than being distributed with equal intensity across the entire near ultrasonic range (e.g., from 14 kHz to 24 kHz). For instance, as shown in the illustrated example of FIG. 2, there is a slight rise in the intensity of the noise at frequencies just below 20 kHz relative to other frequency bands within the near ultrasonic range.

In some examples, differences in the spectral power of noise in different frequency bands are relied upon to improve the accuracy of detecting acoustic pulses 112 and also to reduce power consumption. In particular, this is accomplished by dividing the near ultrasonic frequency range into multiple bands and separately determining the signal power of noise in each band. For instance, FIG. 2 illustrates five frequency bands 202, 204, 206, 208, 210 of 2 kHz each spanning the full near ultrasonic frequency range. More particularly, the first frequency band 202 (Band-0) ranges from 14 kHz to 16 KHz with a central frequency of 15 kHz, the second frequency band 204 (Band-2) ranges from 16 kHz to 18 kHz with a central frequency of 17 kHz, the third frequency band 206 (Band-3) ranges from 18 kHz to 20 KHz with a central frequency of 19 kHz, the fourth frequency band 208 (Band-3) ranges from 20 KHz to 22 kHz with a central frequency of 21 kHz, and the fifth frequency band 210 (Band-4) ranges from 22 kHz to 24 kHz with a central frequency of 21 kHz. In other examples, there may be more or fewer bands than five that span more or less than a 2 kHz range. Further, in some examples, less than all of the near ultrasonic frequency range may be used. Thus, in some examples, the bands 202, 204, 206, 208, 210 may be limited to a range less than all of 14 KHz to 24 kHz (e.g., between 16 kHz and 24 kHz, between 18 kHz and 24 kHz, between 15 kHz and 22 kHz, etc.).

As mentioned above, the power of the noise in each of the frequency bands 202, 204, 206, 208, 210 is determined. More particularly, in some examples, an average power across each band is determined. The discrete Fourier transform (DFT) of an audio frame of length N is $$X[k] = \sum_{n=0}^{N-1} x[n]\left(\cos\frac{2\pi nk}{N} - i\sin\frac{2\pi nk}{N}\right) \quad \text{Eq. 5}$$

where $x[n]=x_0, x_1, x_2 \ldots x_{N-1}$, $X[n]=X_0, X_1, X_2 \ldots X_{N-1}$, N=Frame duration (e.g., N=2048), and k=0→N−1. Taking the first half of the DFT output yields $$X'[k]=X_0, X_1, X_2 \ldots X_{N/2-1} \quad \text{Eq. 6}$$

Calculating the power spectrum may be achieved through the following formulas $$Y[k] = \frac{2}{FN}|X'[k]|^2 \quad \text{Eq. 7}$$

$$P[k] = 10\log_{10}(Y[k]) \quad \text{Eq. 8}$$

A particular bin (k) of a frequency (f) may be defined as $$k_f = \frac{N}{F}f \quad \text{Eq. 9}$$

Based on this definition, the average power of a spectral band (PB[n]) is $$PB[n]=\text{Mean}(P[k_{BinStart}] \text{ to } P[k_{BinEnd}]) \quad \text{Eq. 10}$$

where $k_{BinStart}$ is the start bin number of a particular spectral band (e.g., one of the bands 202, 204, 206, 208, 210 of FIG. 2) and $k_{BinEnd}$ is the end bin number of a particular spectral band.

Using the average power calculated for each band 202, 204, 206, 208, 210, the power of the noise signal in each band can be compared to the other bands. This is graphically represented in FIG. 2, for purposes of illustration, by the height of the brackets representing the bands 202, 204, 206, 208, 210. Thus, as shown in the illustrated example, the third band 206 has the highest power, followed by the first band 202. The second and fourth bands 204, 208 have approximately the same power. Finally, the fifth band 210 has the lowest power of the five bands.

In some examples, the speaker 102 of the computing device 100 is excited to generate an acoustic pulse 112 at a particular frequency based on an analysis of the power levels of the different frequency bands 202, 204, 206, 208, 210. In particular, the bands 202, 204, 206, 208, 210 are ranked or ordered from lowest power to highest power and the excitation pulse frequency of the acoustic pulse 112 is shifted to be within the frequency band 202, 204, 206, 208, 210 with the lowest power. That is, the acoustic pulse 112 is generated at a frequency that is the least contaminated by noise to facilitate its subsequent detection by the microphone 104. In some examples, to facilitate the comparison of the spectral power of noise in each frequency band 202, 204, 206, 208, 210, the calculated values are quantized into one of a number of different noise power bins. For example, the calculated powers may be quantized into one of four bins defined as signal power less than −80 dB (Bin 1), signal power equal to or greater than −80 dB and less than −60 dB (Bin 2), signal power equal to or greater than −60 dB and less than −40 dB (Bin 3), and signal power equal to or greater than −40 dB (Bin 4). In other examples, the calculated power of the noise in each frequency band 202, 204, 206, 208, 210 may be quantized into more or fewer noise power bins than four. Further, the noise power bins may be divided at any suitable power levels.

In some examples, the power level of noise in each frequency band 202, 204, 206, 208, 210 is quantized before the frequency bands are ranked or ordered. As a result, it is possible that two or more of the frequency bands 202, 204, 206, 208, 210 may be quantized into the same bin. For instance, in the illustrated example of FIG. 2, the signal power in each of the first four frequency bands 202, 204, 206, 208 falls between −80 dB and −60 dB and, therefore, all would be quantized into Bin 2 in the above example. However, the signal power in the fifth frequency band 210 is below −80 dB and, therefore, would be quantized into Bin 1 in the above example. Based on the quantization of the frequency bands 202, 204, 206, 208, 210 in this example, the fifth frequency band would be ranked as a better choice for the excitation frequency of the acoustic pulses 112 because power of the noise in that frequency band 210 is lower than in the other frequency bands 202, 204, 206, 208. Accordingly, the central frequency (e.g., fin Equation 1) for the acoustic pulses 112 would be shifted to be within the fifth frequency band 210. In some examples, the central frequency for the acoustic pulses 112 is selected to be the center frequency of the lowest power frequency band (e.g., 23 kHz for the fifth frequency band 210).

In some examples, more than one of the frequency bands 202, 204, 206, 208, 210 may be quantized to the lowest noise power bin. For example, if the power in the fifth frequency band 210 of FIG. 2 were slightly higher so as to be above −80 dB, all five frequency bands 202, 204, 206, 208, 210 would be quantized into the same power bin (Bin 2). In such an example, each band 202, 204, 206, 208, 210 would be assigned the same rank as every other band such that there is no single frequency band that would be identified as more suitable than the others for the acoustic pulses 112. This situation, in which multiple bands are identified as equally suitable for acoustic pulses, is likely to occur relatively frequently, particularly in circumstances where there is relatively little noise (e.g., a quiet office space). In some such examples, any one of the equally suitable frequency bands may be selected to define the central frequency of the acoustic pulse.

In some examples, when there are multiple equally suitable frequency bands 202, 204, 206, 208, 210 for the acoustic pulses 112 (e.g., more than one band with the same lowest ranking), the speaker 102 may switch or hop between different ones of the equally suitable frequency bands 202, 204, 206, 208, 210 to reduce adverse effects of standing waves. More particularly, in some examples, acoustic pulses 112 may be generated at a particular frequency for a threshold period of time (e.g., 5 seconds, 10 seconds, 30 seconds, 1 minute) and then shift to a different frequency associated with a different frequency band 202, 204, 206, 208, 210 for the threshold period of time before shifting to a third frequency band (or back to the first if there are only two equally suitable bands). The acoustic pulse 112 would only shift to the different frequency band 202, 204, 206, 208, 210 if that frequency band had a similar level of noise (e.g., in the same power bin) as the frequency band within which the acoustic pulse 112 was being excited previously (e.g., the different frequency bands are identified as equally suitable for the acoustic pulses 112). In some examples, the frequency used to generate the acoustic pulse 112 may cycle through each frequency band 202, 204, 206, 208, 210 included in the lowest power bin before reusing the same frequency. In this manner, the adverse effects of standing waves can be reduced to improve error resilience in detecting the acoustic pulses 112 for purposes of proximity detection.

A primary source of power consumption for the near ultrasonic based proximity, distance, or depth detection disclosed herein is the power required for pulse excitation. While this power is relatively low because the speaker is excited less than 1% of the time (e.g., for only 3.2 milliseconds of every second of time assuming 8 acoustic pulses 112 each second with a duration of 400 microseconds for each pulse). However, reducing the pulse-excitation power can reduce the amount of power consumed even further to enhance power efficiency by reducing the overall power envelope of the system. Accordingly, in some examples, the computing device 100 dynamically adjusts the signal level or amplitude of pulse excitation based on the amount of noise detected within the frequency band 202, 204, 206, 208, 210 at which the pulse 112 is to be generated. More particularly, the power level of each acoustic pulse 112 is adjusted to be at a target threshold above the power level of the noise without being any higher (within some tolerance level). Exciting the speaker 102 at a power level that is a target threshold above the amount of noise ensures that acoustic pulse 112 can be recognized over the noise. At the same time, exciting the speaker 102 at a power level that is no higher than the target threshold (within some tolerance level) avoids the consumption of excess power that is not necessary to reliably identify the acoustic pulse 112 for proximity detection purposes. Thus, in relatively noisy environments, the acoustic pulses 112 may be generated by exciting the speaker 102 at full power to ensure the pulses 112 may be detected. However, when there is less noise, the power used to excite the speaker 102 is reduced to conserve power but still excited with sufficient power so that the resulting acoustic pulse 112 remains reliably detectable over the noise. Inasmuch as the amount of noise within the near ultrasonic frequency range is typically relatively low, this approach can result in a significant reduction in the over-all power of the system. As a result, the proximity detection may be performed as an "always-on" feature. That is, the proximity detection may be implemented at sufficiently low power to operate when the computing device 100 is in a low power sleep state.

In some examples, the signal level for acoustic pulses 112 is dynamically adjusted by defining different values for the amplitude (A) in Equation 1 defining the basic shape of each pulse 112. In some examples, the amplitude may be defined so that the power of the acoustic pulse 112 is a target threshold (e.g., 20 dB) higher than the power level of the noise. In some examples, the amplitude may be calculated based on the average power of noise in the particular frequency band 202, 204, 206, 208, 210 associated with the central frequency of the acoustic pulse 112. For example, if the current noise level in the relevant frequency band is at −68 dB, the acoustic pulse 112 would be generated with a signal power level of at least −48 dB. In some examples, the particular amplitude and/or associated power level of the acoustic pulse 112 is defined to be a target threshold (e.g., 20 dB) above the particular noise power bin into which the noise of the relevant frequency band 202, 204, 206, 208, 210 was allocated. For instance, in the above example, a noise level of −68 dB may be allocated into the noise power bin corresponding to noise levels ranging from −80 dB to −60 dB. In some such examples, the power level of the acoustic pulse 112 is set to be at −40 dB (20 dB above the upper limit of the noise power bin). Example pulse signal power levels and corresponding amplitudes for the acoustic pulse signal waves for different noise levels are provided in Table 1.

TABLE 1

Acoustic Pulse Signal Power Levels and Amplitudes based on Noise Levels

| Quantization Bin | Noise level (NL) | Pulse Signal Power | Pulse signal amplitude |
|---|---|---|---|
| 1 | NL ≤ −80 dB | −60 dB | 0.001 |
| 2 | −80 dB < NL ≤ −60 dB | −40 dB | 0.01 |
| 3 | −60 dB < NL ≤ −40 dB | −12 dB | 0.1 |
| 4 | −40 dB < NL ≤ −12 dB | −6 dB | 0.2 |
| 5 | −12 dB < NL ≤ −6 dB | 0 dB | 1 |

Generating acoustic pulses 112 at a frequency (e.g., the central frequency f in Equation 1) within a frequency band associated with a lowest level of noise and specifying the amplitude (e.g., A in Equation 1) for the pulses 112 that produces a signal power that is a threshold level above the amount of noise in the corresponding frequency band enables the acoustic pulses 112 and the associated echoes 114 to be reliably detected. More particularly, in some examples, the computing device 100 detects the acoustic pulses 112 and the associated echoes 114 by generating an echo profile for the environment in which the computing device 100 is located. As used herein, an echo profile represents the acoustic pulses 112 directly captured by the microphone 104 as well as the echoes 114 associated with the acoustic pulses 112 reflected off objects in the environment surrounding the computing device 100. An example echo profile 300 is shown in the illustrated example of FIG. 3. As shown in the illustrated example, the high intensity peaks 302 in the signal stream correspond to reference signals (e.g., acoustic pulses 112 directly sensed by the microphone 104 without being reflected). In this examples, the intensity represented on the vertical axis of the graph is a normalized intensity relative to an assumed maximum or reference volume, power, or amplitude of signal relative to the measured power of the signal (e.g., normalized intensity=$V_{in}/V_{max}$). A period of time after each reference signal, there are much lower intensity peaks 304 corresponding to the echoes 114 reflected off of objects in the surrounding environment. The relatively low intensity of the echoes 114 and their distance from (e.g., time delay following) the preceding reference signal is indicative of the objects being at a relatively substantial distance from the computing device 100. More particularly, in this example, there are no objects in the immediate vicinity of the computing device 100 (e.g., within the activation region 116). Rather, the objects reflecting the echoes 114 are other objects in the environment at a farther distance (e.g., walls, furniture, etc.).

In some examples, the echo profile 300 is generated as the result of several stages of preprocessing of the audio data captured by the microphone 104. For instance, in addition to directly sensing the acoustic pulses 112 (e.g., the reference signals) and the echoes 114, the microphone 104 is likely to pick up other noises generated in the environment surrounding the computing device 100. Accordingly, in some examples, the computing device 100 removes substantially all humanly audible noises by processing the input signal through one or more signal filters. In some examples, the computing device 100 processes the input signal using a high pass filter with a cutoff frequency of 14 kHz to eliminate all noise below that frequency. In some examples, the cutoff frequency may be higher than 14 kHz when a smaller portion of the near ultrasonic range is to be used. Further, in some examples, the cutoff frequency of the high pass filter is dynamically adjusted based on changes to the central frequency at which the speaker 102 is excited to generate the acoustic pulses 112. In some examples, the filter is implemented using an elliptic infinite impulse response filter with a 1 decibel passband ripple.

Figure 3:
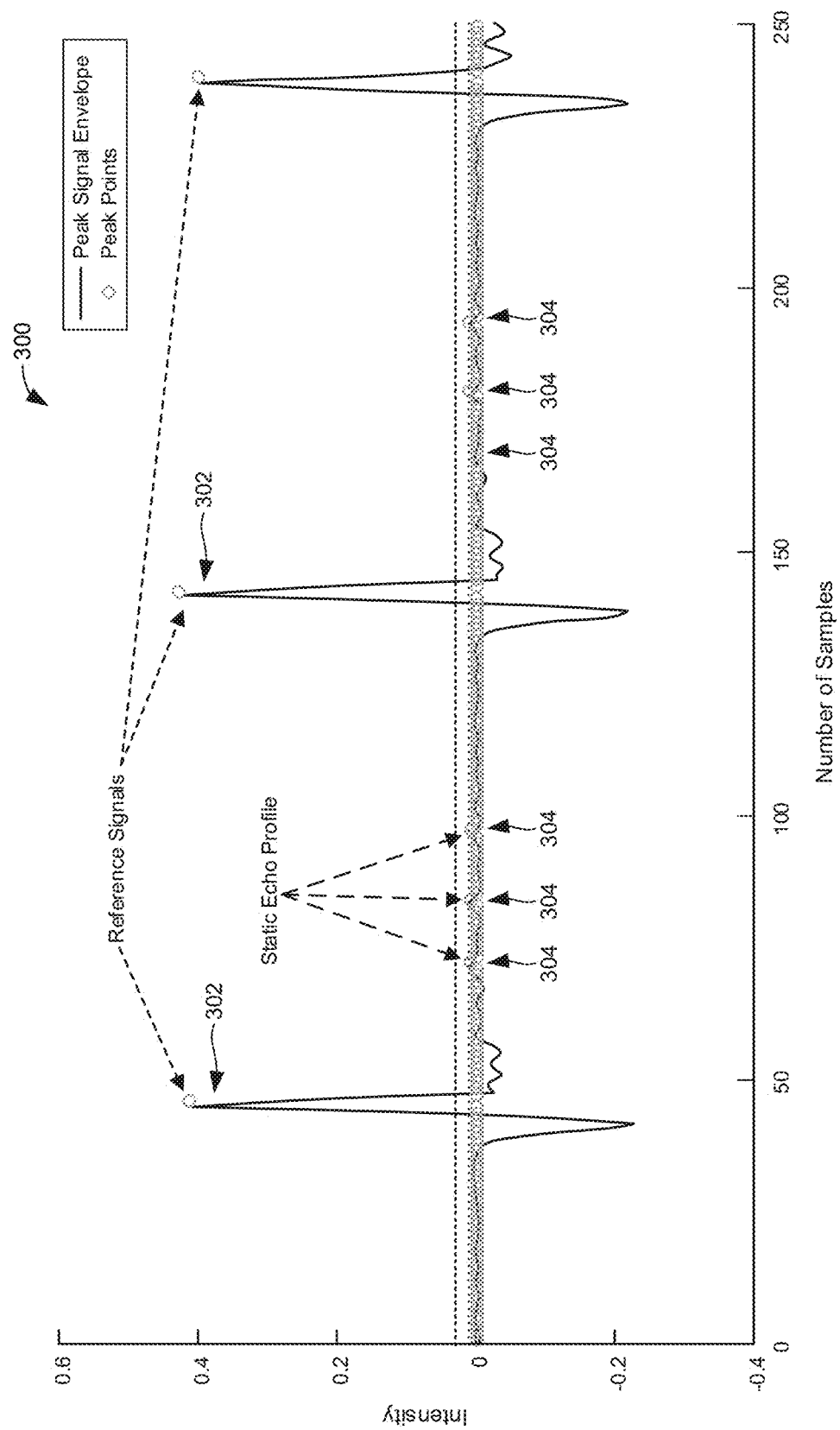
FIG. 3 illustrates an example echo profile generated in accordance with teachings disclosed herein based on actual data.

In some examples, the filtered data is analyzed to identify significant signal peaks in the preprocessed signal (e.g., the peaks 302, 304 of FIG. 3). This is accomplished by first smoothing the filtered data to generate an envelope for the reference signals and associated echoes 114 represented in the filtered data by processing the absolute value of the output signal through a signal squarer and through a low pass filter. In some examples, the low pass filter has a cutoff frequency of 6.4 kHz. Once the envelope of the echoes is generated, the resulting signal is down sampled to 24 kHz. The computing device 100 then detects significant peaks in the down sampled signal (x[n]) as follows:

$$\text{Peak}[n] = \begin{cases} x[n], & x[n] - x[n - dt] > ad \text{ and} \\ & x[n] - x[n + dt] > ad \\ 0 & \text{Otherwise} \end{cases} \quad \text{Eq. 11}$$

where dt is the stride value (e.g., dt=2) and ad is the amplitude difference across peak (e.g., ad=0.12).

A full echo profile can be expressed mathematically as:

$$EchoProfile[n] = RefSig[n] + \sum_{m=0}^{M-1} \text{echo}[m] \quad \text{Eq. 12}$$

where RefSig[n] refers to each reference signal and echo[m] refers to each echo 114 captured by the microphone 104 from the environment.

Assuming that the computing device 100 does not move relative to its environment, the echoes 114 reflected off static objects in the environment should be relatively consistent over time (e.g., consistent intensity and consistent time delay). Accordingly, in some examples, the echo profile information corresponding to static-object echoes are identified and stored to distinguish echoes from such static objects relative to echoes from moving objects (e.g., a human moving in the vicinity of the computing device 100) for which the echoes 114 will vary in intensity and/or time delay as the object moves. That is, in some examples, static-object echo information may be subtracted from a full echo profile to isolate echoes corresponding to non-static objects. Once identified, echoes 114 corresponding to non-static objects are further analyzed for the possibility of corresponding to an object within the activation region 116 of the computing device 100 as described further below. In some examples, all echoes are analyzed for the possibility of corresponding to an object within the activation region 116. That is, in some examples, the full echo profile may be analyzed without subtracting out static-object echoes.

Figure 4:
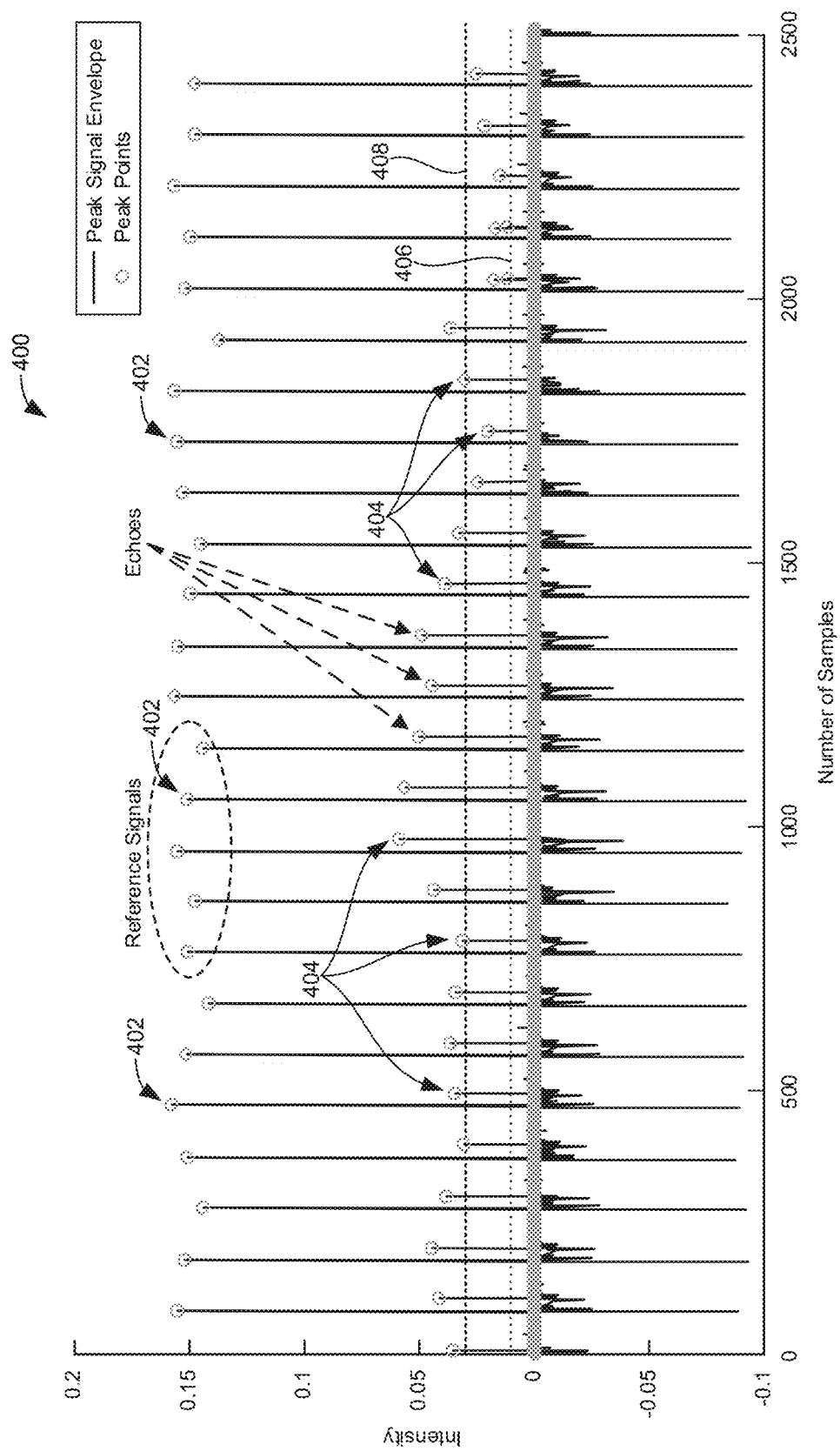
FIG. 4 illustrates another example echo profile generated in accordance with teachings disclosed herein based on actual data.

An example echo profile 400 based on actual data in which an object is moving in close proximity to the computing device 100 is shown in the illustrated example of FIG. 4. As with the example echo profile 300 of FIG. 3, the echo profile 400 includes high intensity peaks 402 (e.g., high normalized intensity) corresponding to reference signals (associated with directly sensed acoustic pulses 112) and lower intensity peaks 404 corresponding to echoes 114 of the acoustic pulses 112. As compared with the low intensity peaks 304 in FIG. 3, the low intensity peaks 404 in FIG. 4 are considerably larger when viewed as a proportion of the intensity of the associated reference signals (e.g., the high intensity peaks 402). Further, the low intensity peaks 404 in FIG. 4 are relatively close to the preceding reference signal. The somewhat higher intensity of the low intensity peaks 404 and the relatively short duration after the corresponding reference signal is indicative of an echo 114 reflected off an object that is relatively close to the computing device 100 (e.g., within the activation region 116).

As shown in FIG. 4, the intensity of the low intensity peaks 404 varies considerably from one peak to the next indicating that the object reflecting the corresponding echoes 114 is a non-static object (e.g., an object that is moving relative to the computing device 100). In this particular example, the data reflected in FIG. 4 is based on a user's hand moving away from and towards an associated computing device implementing the processes disclosed herein. It should be noted that there is also some variability in the intensity of the high intensity peaks 402 corresponding to the reference signals. In ideal conditions, the reference signals should be substantially identical in intensity as described above. However, some variability is expected due to imperfect environmental conditions and/or as a result of some measure of error introduced by the preprocessing of the input data captured by the microphone 104. While there is some variability in the intensity of the reference signals, the periodicity of the reference signals is substantially consistent over time.

In some examples, the output of the speaker 102 is not synchronized or timed to the noise information collected by the microphone 104. Accordingly, the system analyzing the noise information does not have any way to directly identify when an acoustic pulse 112 is sensed directly by the microphone 104 (i.e., a reference signal) and when noises captured by the microphone 104 correspond to echoes 114 (or other environmental noise). Accordingly, before distance or proximity calculations can be made (based on time delays between reference signals and corresponding echoes 114), the computing device 100 first needs to identify which peaks in the echo profile (e.g., the echo profile 400) correspond to the reference signals and which correspond to the echoes 114. In some examples, the reference signals are detected by analyzing the noise information over time until a repeating signal is identified that satisfies criteria corresponding to the repeating acoustic pulses 112. More particularly, in some examples, the criteria that must be satisfied for a signal to constitute a reference signal includes (1) that the signal repeats with a substantially consistent periodicity (e.g., within a consistency threshold) corresponding to the time interval of successive ones of the acoustic pulses 112 and (2) that the repeating signal has an intensity that satisfies a signal intensity threshold of an expected signal level for the acoustic pulses 112.

Figure 5:
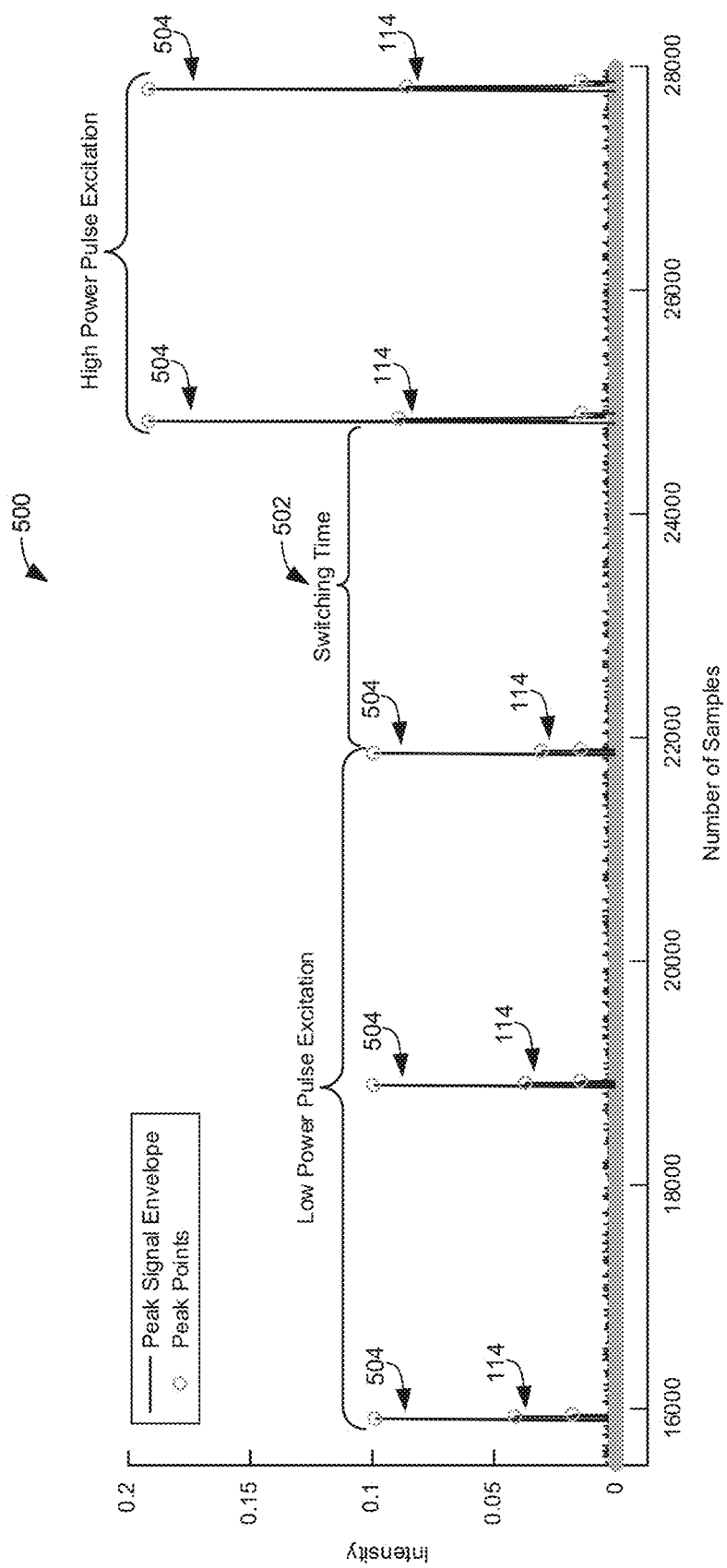
FIG. 5 illustrates another example echo profile representing a change in the amplitude of acoustic pulses generated in accordance with teachings disclosed herein.

With respect to the second criterion, in some examples, the repeating signal must fall between an upper signal intensity threshold and a lower signal intensity threshold. In other examples, the repeating signal only needs to exceed a lower signal intensity threshold that is higher than a maximum intensity expected for an echo 114. As discussed above, in some examples, the computing device 100 may dynamically adjust the power or amplitude of the excitation signal the speaker 102 used to generate the acoustic pulses 112. Accordingly, in some examples, the computing device 100 may also dynamically adjust the signal intensity threshold to correspond with the change in power of the acoustic pulses 112 and the associated echoes 114. For instance, FIG. 5 illustrates an example echo profile 500 in which acoustic pulses 112 are switched from a relatively low power band to a higher power band during a switching time 502. In this example, the reference signals 504 nearly double in intensity (e.g., normalized intensity) after the switching time 502 relative to before the switching time. As a result, the intensity of the echoes 114 also increases considerably after the switching time 502 relative to before the switching time. Indeed, as shown in the illustrated examples, the intensity of the echoes 114 after the switching time is nearly the same as the intensity of the reference signals 504 before the switching time. However, in this example, the signal intensity threshold is increased during the switching time 502 so that only a much higher intensity signal (e.g., the higher intensity reference signals 504) would satisfy the second criterion noted above.

Figures 6, 7:
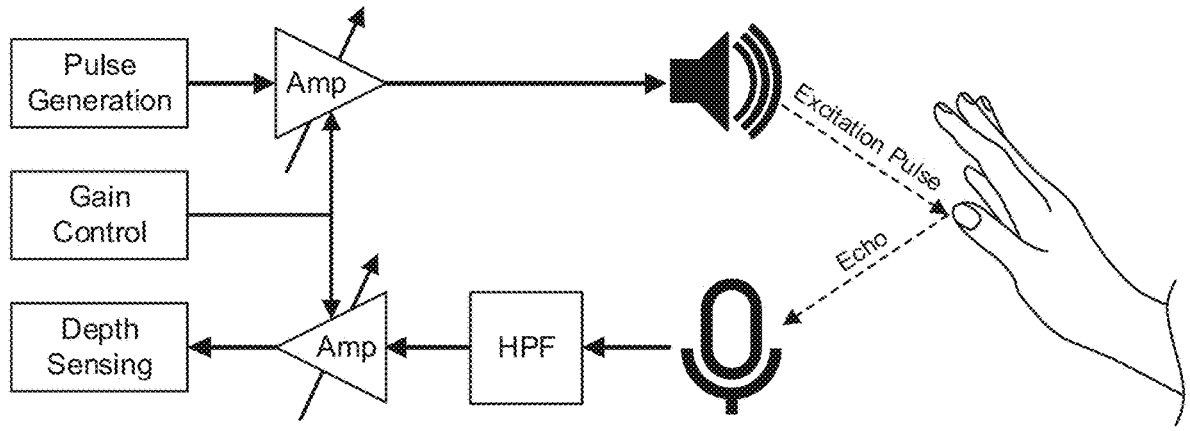
FIG. 6 is a block diagram representing the process flow for proximity detection implemented in accordance with teachings disclosed herein.
FIG. 7 is a table providing experimental results from implementing teachings disclosed herein.

In addition to depending on the amplitude or corresponding power of the acoustic pulses 112 produced by the speaker 102, the ability of the computing device 100 to detect the acoustic pulses 112 and the associated echoes 114 depends on the sensitivity of the microphone 104. In some examples, the power of the excitation pulse and the sensitivity of the microphone 104 are defined based on an amplifier gain in the circuitry for both the speaker 102 and the microphone 104 as represented in the block diagram of FIG. 6. In this example, amplifier gains on both the speaker and microphone paths are calibrated to improve performance and increase power savings. More particularly, in some examples, the amplifier gains in the pulse generation path and the microphone path are tuned to achieve the following three signal characteristics with threshold normalized relative to a specified maximum amplitude, power, or intensity. First, the minimum amplitude level or intensity for the reference signal (e.g., the signal intensity threshold) is to be between 0.1 and 0.2. Second, the maximum idle level or intensity of echoes 114 during idle time (e.g., the idle echo threshold 406 shown in FIG. 4) is to be less than 0.01. Finally, the minimum level or intensity of echoes 114 for a valid echo 114 to be used for object distance sensing (e.g., the valid echo threshold 408 shown in FIG. 4) is to be less than or equal to 0.03. In other examples, different values for the thresholds higher or lower than those provided above may be used.

In some examples, identification of the reference signals is based on an analysis of the echo profile that includes signals corresponding to the acoustic pulses 112 as well as echoes 114 from static and/or non-static objects. The intensity of echoes 114 reflected off static objects (e.g., walls, furniture, etc.) will typically be relatively low because such objects are typically a significant distance away from the computing device 100 (e.g., at least outside the activation region 116). As a result, echoes 114 reflected off such static objects will not satisfy the second criterion for a reference signal of having an intensity above the signal intensity threshold. Because non-static objects are moving relative to the computing device 100, the timing at which subsequent ones of the echoes 114 reflected off such non-static objects are detected will not be consistent. As a result, the echoes 114 reflected off non-static objects will not satisfy the first criterion of a consistent periodicity corresponding to the time interval between separate acoustic pulses. Further, depending on the distance of the non-static object, the intensity of the echoes 114 reflected thereby likely will not satisfy the second criterion. By contrast, because the acoustic pulses 112 are repeated at consistent intervals and sensed directly by the microphone 104, the acoustic pulses directly detected by the microphone 104 can be recognized as the reference signals as outlined above. In some examples, computations of the analysis to identify reference signals are simplified by requiring only the first criterion or only the second criterion to be satisfied.

Once reference signals have been identified, the computing device 100 may continue to monitor for and detect subsequent reference signals to verify that the system remains synchronized to the timing at which the speaker 102 produces the acoustic pulses 112 (based on the signals continuing to be detected at the expected periodicity). Aside from continuing to identify subsequent reference signals, the computing device 100 also performs object distance calculations on the echoes 114 contained in the echo profile being analyzed. As mentioned above, the time delay between a directly detected acoustic pulse 112 (e.g., a reference signal) and an echo 114 of the acoustic pulse 112 is proportional to the distance of the object reflecting the echo 114. As a result, by determining the time between a reference signal and a following echo, the computing device 100 may determine the distance of an associated object from the computing device 100. This can be expressed mathematically as follows:

$$\text{EchoDuration}[m] = \text{EchoTime}[m] - \text{ReferenceTime}[n] \quad \text{Eq. 6}$$

$$\text{EchoDepth}[m] = \text{EchoDuration}[m] / \text{DepthScaleFactor} \quad \text{Eq. 7}$$

where ReferenceTime[n] is the time index of the reference signal preceding the particular echo 114 being analyzed, and EchoTime[m] is the time index of the particular echo 114. For the above equations to work, it is assumed that EchoTime[m] is greater than ReferenceTime[n], which necessarily assumes that EchoDuration[m] is greater than 0. In some examples, when the calculated distance of an object (e.g., EchoDepth[m]) is less than the threshold distance 118 for the activation region 116, the computing device 100 may generate an output that causes the activation or initiation of an operation associated with an object being detected in the activation region 116.

Experimental testing has shown that teachings disclosed herein provide accurate and robust results regardless of the level or nature of noise in the environment. Particular test results are shown in the table 700 of FIG. 7. As shown in the table 700, accuracy remained at or above 90% across all different types of noise. Furthermore, testing has shown that there can be significant power savings obtained based on the trimming of the power level of the acoustic pulses 112 in response to lower levels of noise. In particular, as shown in the table 700, as much as an 80% reduction in power consumption (relative to excitation of the speaker 102 at full power) is possible under many different noise conditions. Further, as shown in the illustrated example, a deadlock or bad detection state never occurred in any of the different noise environments tested.

Figure 8:
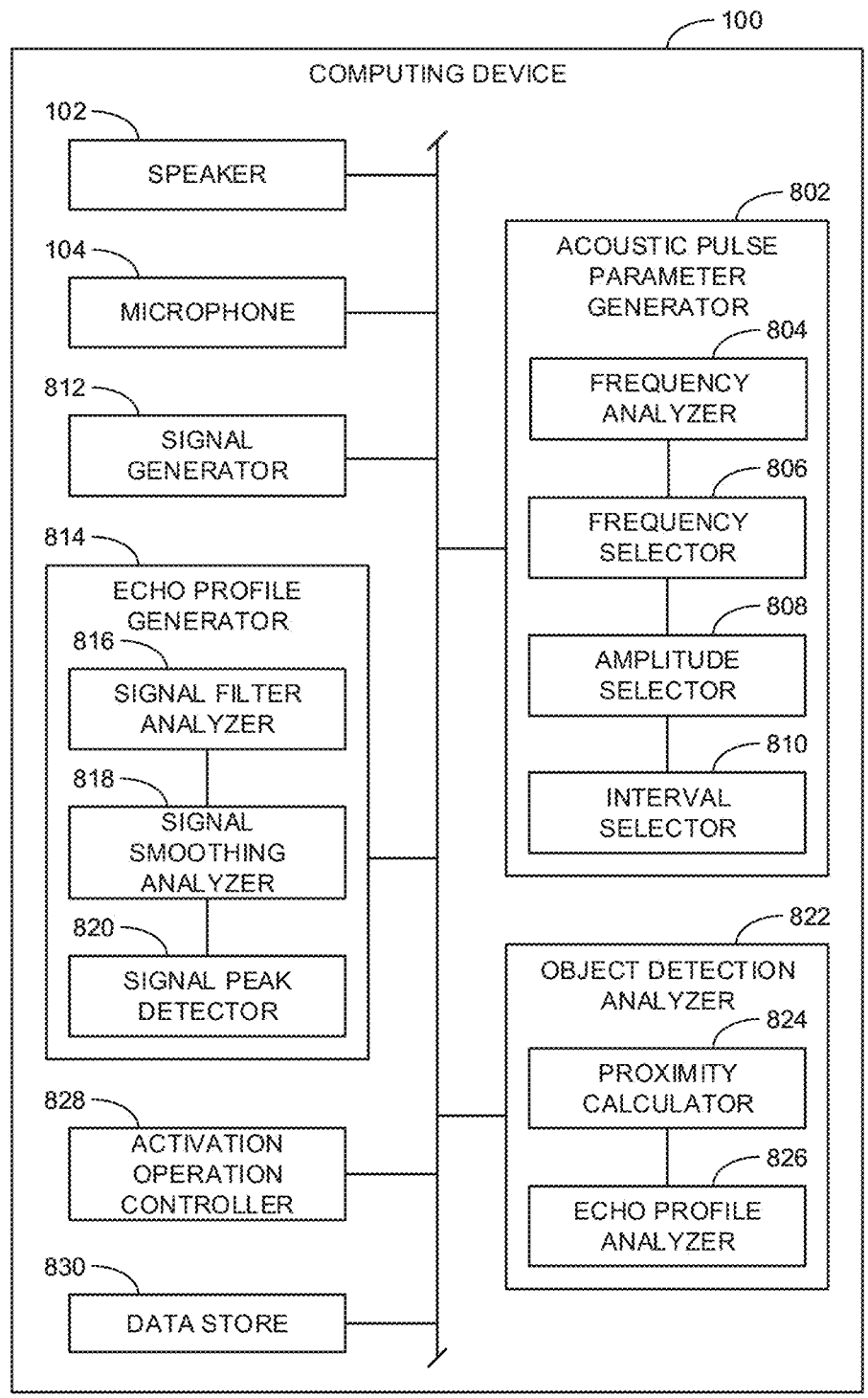
FIG. 8 illustrates an example implementation of the example computing device of FIG. 1.

FIG. 8 illustrates an example implementation of the example computing device 100 of FIG. 1. As shown in the illustrated example, the computing device 100 includes the example speaker 102, the example microphone 104, an example acoustic pulse parameter generator 802 (that includes an example frequency analyzer 804, an example frequency selector 806, and an example amplitude selector 808, and an example interval selector 810), an example signal generator 812, an example echo profile generator 814 (that includes an example signal filter analyzer 816, an example signal smoothing analyzer 818, and an example signal peak detector 820), an example object detection analyzer 822 (that includes an example proximity calculator 824, and an example echo profile analyzer 826), an example activation operation controller 828, and an example data store 830.

The example acoustic pulse parameter generator 802 generates and/or defines parameters defining the excitation of the speaker 102 to generate the acoustic pulses 112. As used herein, the acoustic parameters include the excitation frequency (f) and the amplitude (A) used in Equation 1 to define the characteristics of the excitation signal used to generate each acoustic pulse 112. The acoustic pulse parameters may include other parameters if the shape of the signal is defined by a different equation and/or with different characteristics. Further, in some examples, the acoustic pulse parameters include an interval or periodicity at which the pulses are to be produced. In some examples, the acoustic pulse parameters may be configurable or defined by a user. In other examples, at least some of the acoustic pulse parameters are defined dynamically based on current circumstances (e.g., noise levels) of the environment where the computing device 100 is located.

More particularly, the example frequency analyzer 804 analyzes the noise associated with the surrounding environment to determine the power level of noise in different frequency bands. In some examples, the frequency analyzer 804 converts audio data generated by the microphone 104 into the frequency domain using a Fast Fourier Transform (FFT). Once the audio data is in the frequency domain, the frequency analyzer 804 analyzes specific frequency bands of interest. As discussed above, in some examples, the frequency bands of interest include different frequency bands (e.g., the frequency bands 202, 204, 206, 208, 210 of FIG. 2) within the near ultrasonic frequency range (e.g., 14 kHz to 24 kHz). In some examples, the frequency bands of interest may be limited to a narrower frequency range and/or a wider frequency range. The example frequency analyzer 804 analyzes the frequencies within each frequency band to determine a power level of noise within the frequency band.

The example frequency selector 806 uses the calculated noise levels in the different frequency bands (as determined by the frequency analyzer 804) to identify or select a particular frequency band within which the acoustic pulses 112 are to be excited. More particularly, in some examples, the frequency selector 806 compares the level of noise in each frequency band to identify the band(s) having the lowest amount of noise. In some examples, the frequency selector 806 quantizes the noise levels for the different frequency bands into different noise power bins to facilitate the comparison of the different frequency bands and also to facilitate the grouping of different frequency bands that are to be treated as equally suitable for pulse excitation based on having similar noise levels (within some threshold). In some examples, the frequency selector 806 selects the frequency band with the lowest amount of noise as the frequency band within which the central frequency of the acoustic pulse 112 is to be defined. In some examples, the frequency selector may select a particular frequency for the central frequency of the acoustic pulses. In some examples, the central frequency is selected as the center frequency of the frequency band. In other examples, a different frequency within the frequency band associated with the lowest level of noise is selected.

In some situations, there may be multiple frequency bands that are determined to be in the lowest noise power bin such that selecting a central frequency for the acoustic pulse 112 to be in anyone of these frequency bands is equally suitable. In some such examples, the frequency selector 806 may select a first one of the low-noise frequency bands for a threshold period of time and then switch to a different one of the low-noise frequency bands. In some examples, the frequency selector 806 cycles through all frequency bands in the lowest noise power bin before returning to any one of the frequency bands. The threshold period of time that the central frequency of the acoustic pulse 112 dwells at a particular frequency band when there are multiple equally suitable frequency bands may be any suitable period of time (e.g., 2 seconds, 3 seconds, 5 seconds, 10 seconds, 15 seconds, 30 seconds, 1 minute, etc.). In some examples, this threshold period of time is set by a user.

The example amplitude selector 808 determines a suitable amplitude for the excitation signal for the acoustic pulses 112 based on the amount of noise in the particular frequency band selected by the frequency selector 806. More particularly, in some examples, the amplitude selector 808 selects an amplitude that will result in a signal power level of the acoustic pulse 112 that is at least a first threshold above the noise level of the corresponding frequency band but no more than a second threshold above the noise level of the corresponding frequency band. Defining the amplitude to produce an acoustic pulse 112 with power at or above the first threshold ensures that the acoustic pulse 112 and associated echoes 114 can be identified over the noise. Further, defining the amplitude to produce an acoustic pulse with power that is no more than the second threshold reduces the consumption of power for a more power efficient system. In some examples, the first threshold and the second threshold have the same value above the noise level of the corresponding frequency band with the amplitude being set to correspond to the value of the threshold.

The example interval selector 810 selects the interval or periodicity at which the acoustic pulses 112 are generated. In some examples, the interval for the acoustic pulses 112 is a configurable parameter defined by a user. In some examples, different intervals may be used depending on the power state of the computing device 100. For example, a first, longer interval may be defined for a low power (e.g., sleep) state with a second, shorter interval for higher power (e.g., active) states. The longer interval results in the use of less power but with the tradeoff of there being less precision and/or accuracy in detecting objects in the vicinity of the computing device. By contrast, the shorter interval results in greater accuracy but at the cost of more power. In some examples, the acoustic pulse parameters (e.g., central frequency, amplitude, and fixed interval) are stored in the example data store 830.

The example signal generator 812 controls the excitation of the speaker 102 to produce the acoustic pulses 112 based on the acoustic pulse parameters defined by the acoustic pulse parameter generator 802. In some examples, to improve computational efficiency, the signals centered within the different frequency bands are generated and recorded for subsequent use by merely replaying the recorded signal (amplified as appropriate based on the specified amplitude) such that the signal does not need to be entirely redefined for each new acoustic pulse 112. In some such examples, the recorded signals are stored in the example data store 830.

The example echo profile generator 814 of FIG. 8 performs the preprocessing of audio information captured by the microphone 104 to generate echo profiles (e.g., the echo profiles 300, 400, 500 of FIGS. 3, 4, and/or 5) associated with the current circumstances of the computing device 100. More particularly, in illustrated example, the signal filter analyzer 816 processes the audio information based on one or more filters. In some examples, the filters include a band pass filter to remove all data outside of the near ultrasonic range (e.g., between 14 kHz and 24 kHz). In other examples, separate low pass and high pass filters may be implemented. In some examples, the audio is filtered to focus on a particular one of the frequency bands 202, 204, 206, 208, 210 within which the central frequency of the acoustic pulses 112 is currently assigned (as defined by the acoustic pulse parameters). The example signal smoothing analyzer 818 analyzes the filtered audio information to define the signal envelope for the signal samples contained in the filtered audio information. The example signal peak detector 820 analyzes the smoothed audio information to identify significant peaks within the audio information. The output of the echo profile generator 814 corresponds to the echo profile associated with the current environment in which the computing device 100 is located. In some examples, the echo profile is stored in the example data store 830.

The example object detection analyzer 822 analyzes the echo profiles generated by the echo profile generator 814 to identify objects within the vicinity of the computing device 100. Specifically, in some examples, the object detection analyzer 822 is interested in determining whether an object is within the activation region 116 of the computing device 100 and, more particularly, in some examples, the distance of such an object. The example proximity calculator 824 determines a proximity or distance of an object reflecting an echo 114 represented in the echo profile based on the duration of time between a particular reference signal in the profile and a following echo signal. The example echo profile analyzer 826 identifies and tracks reference signals as they occur in the echo profile to maintain synchronization with the timing of when the acoustic pulses 112 (associated with the reference signals) are generated by the speaker 102. Further, the example echo profile analyzer 826 identifies echoes indicative of nearby objects to be compared by the proximity calculator 824 to the reference signals.

The example activation operation controller 828 implements or causes to be implemented an operation in the computing device 100 in response to the object detection analyzer 822 determining an object is within the activation region 116 of the computing device 100. In some examples, the operation includes waking up the computing device 100 from a low power sleep state or idle state to a full power active state. However, any other operation may also be implemented in response to detection of the object within the activation region 116. In some examples, the operation is only implemented if the object is detected within the activation region 116 for a threshold period of time (e.g., 1 second, 2 seconds, 3 seconds, etc.).

While an example manner of implementing the computing device 100 of FIG. 1 is illustrated in FIG. 8, one or more of the elements, processes and/or devices illustrated in FIG. 8 may be combined, divided, re-arranged, omitted, eliminated and/or implemented in any other way. Further, the example acoustic pulse parameter generator 802, the example frequency analyzer 804, the example frequency selector 806, the example amplitude selector 808, the example interval selector 810, the example signal generator 812, the example echo profile generator 814, the example signal filter analyzer 816, the example signal smoothing analyzer 818, the example signal peak detector 820, the example object detection analyzer 822, the example proximity calculator 824, the example echo profile analyzer 826, the example activation operation controller 828, the example data store 830, and/or, more generally, the example computing device 100 of FIG. 8 may be implemented by hardware, software, firmware and/or any combination of hardware, software and/or firmware. Thus, for example, any of the example acoustic pulse parameter generator 802, the example frequency analyzer 804, the example frequency selector 806, the example amplitude selector 808, the example interval selector 810, the example signal generator 812, the example echo profile generator 814, the example signal filter analyzer 816, the example signal smoothing analyzer 818, the example signal peak detector 820, the example object detection analyzer 822, the example proximity calculator 824, the example echo profile analyzer 826, the example activation operation controller 828, the example data store 830, and/or, more generally, the example computing device 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example acoustic pulse parameter generator 802, the example frequency analyzer 804, the example frequency selector 806, the example amplitude selector 808, the example interval selector 810, the example signal generator 812, the example echo profile generator 814, the example signal filter analyzer 816, the example signal smoothing analyzer 818, the example signal peak detector 820, the example object detection analyzer 822, the example proximity calculator 824, the example echo profile analyzer 826, the example activation operation controller 828, and/or the example data store 830 is/are hereby expressly defined to include a non-transitory computer readable storage device or storage disk such as a memory, a digital versatile disk (DVD), a compact disk (CD), a Blu-ray disk, etc. including the software and/or firmware. Further still, the example computing device 100 of FIG. 1 may include one or more elements, processes and/or devices in addition to, or instead of, those illustrated in FIG. 8, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 9:
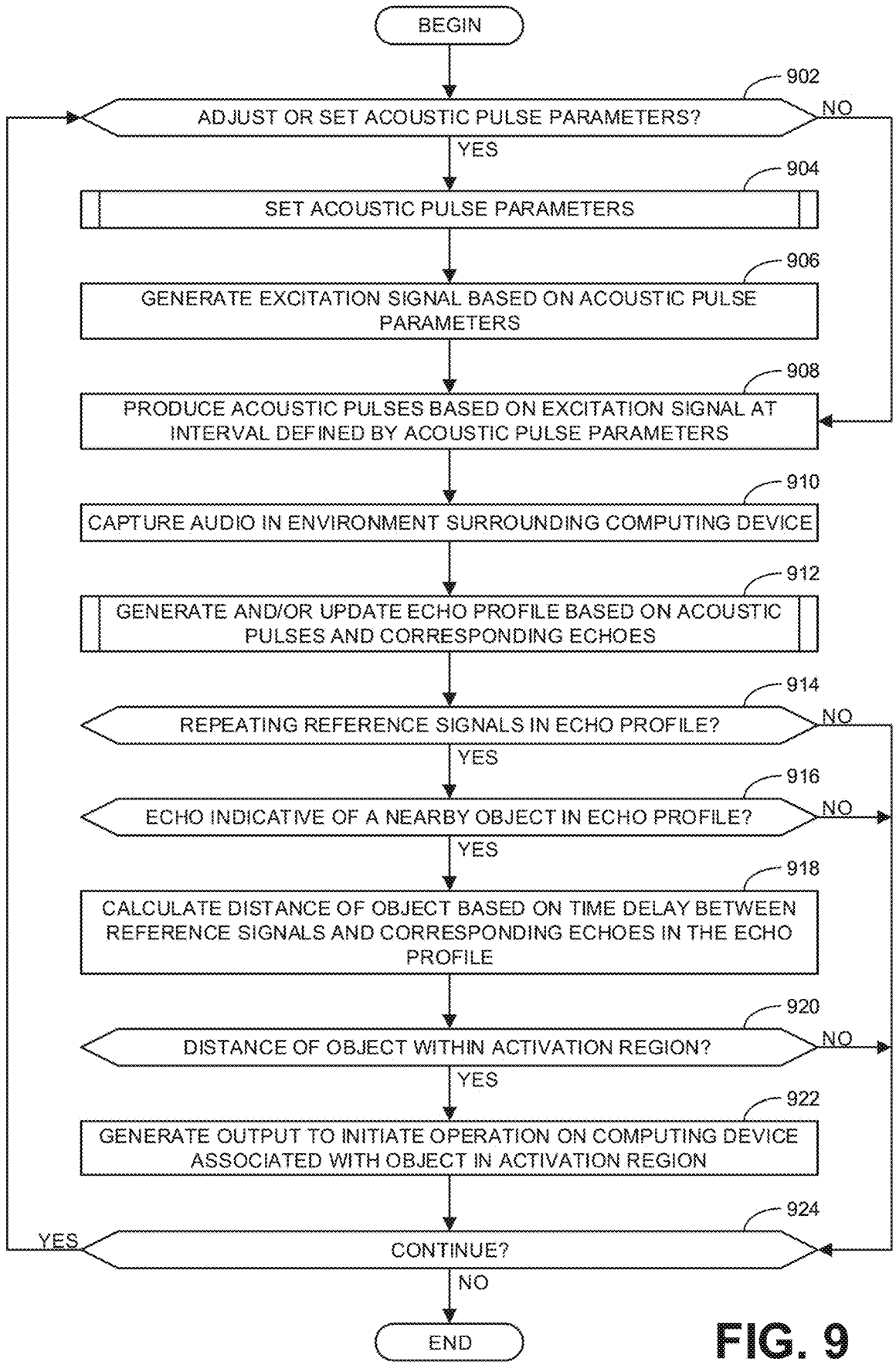
FIGS. 9-11 are flowcharts representative of example machine readable instructions that may be executed to implement the example computing device of FIGS. 1 and/or 8.
Figure 10:
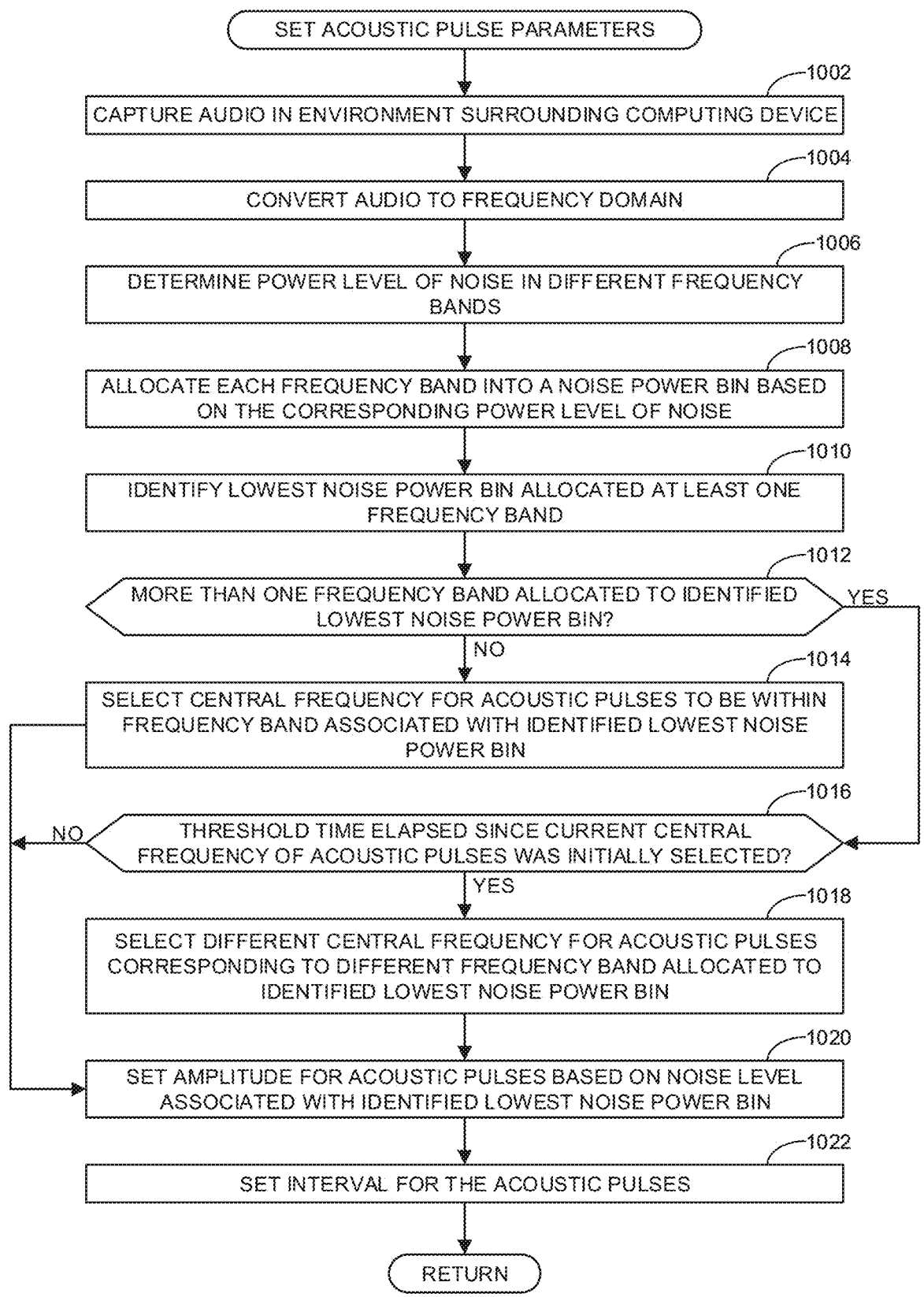
Figure 11:
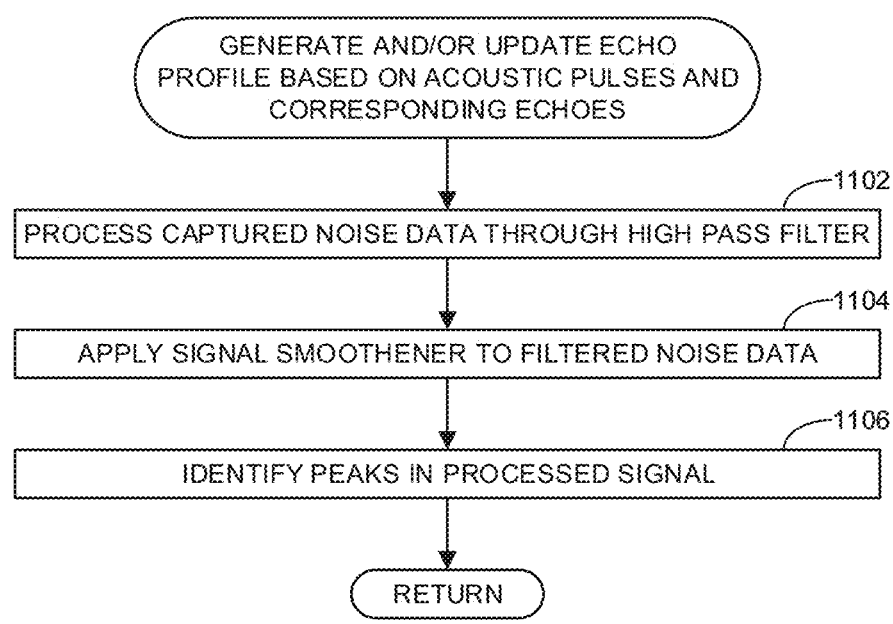

A flowchart representative of example hardware logic, machine readable instructions, hardware implemented state machines, and/or any combination thereof for implementing the computing device 100 of FIGS. 1 and/or 8 is shown in FIGS. 9-11. The machine readable instructions may be one or more executable programs or portion(s) of an executable program for execution by a computer processor and/or processor circuitry, such as the processor 1212 shown in the example processor platform 1200 discussed below in connection with FIG. 12. The program may be embodied in software stored on a non-transitory computer readable storage medium such as a CD-ROM, a floppy disk, a hard drive, a DVD, a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowchart illustrated in FIGS. 9-11, many other methods of implementing the example computing device 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 9-11 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The example program of FIG. 9 begins at block 902 where the example acoustic pulse parameter generator 802 determines whether to adjust or set acoustic pulse parameters. In some examples, the acoustic pulse parameter generator 802 determines to set the parameters when the program of FIG. 9 is first initialized and begun. Thereafter, the example acoustic pulse parameter generator 802 determines to adjust the parameters after a threshold period of time has elapsed. The threshold period of time may be any suitable amount of time (e.g., 5 seconds, 10 seconds, 30 seconds, 1 minutes, 5 minutes, 10 minutes, etc.). In some examples, the threshold period of time is user configurable. If the example acoustic pulse parameter generator 802 determines to adjust or set the acoustic pulse parameters, control advances to block 904 where the example acoustic pulse parameter generator 802 sets the acoustic pulse parameters. Further detail regarding the implementation of block 904 is provided below in connection with FIG. 10.

After the acoustic pulse parameters have been set, control advances to block 906 where the example signal generator 812 generates an excitation signal based on the acoustic pulse parameters. Thereafter, control advances to block 908. Returning to block 902, if the example acoustic pulse parameter generator 802 determines not to adjust or set the acoustic pulse parameters (e.g., the parameters are to remain as previously set), control advances directly to block 908.

At block 908, the example speaker 102 produces acoustic pulses (e.g., the acoustic pulses 112) based on the excitation signal (generated at block 906) at the interval defined by the acoustic pulse parameters. At block 910, the example microphone 104 captures audio in the environment surrounding a computing device (e.g., the computing device 100). The captured audio will include both the acoustic pulses 112 produced at block 908 and echoes 114 based on the acoustic pulses 112 reflecting off objects in the environment. Further, the captured audio will also include any noise produced in the environment. At block 912, the example echo profile generator 814 generates and/or updates an echo profile (e.g., the echo profiles 300, 400, 500 of FIGS. 3-5) based on the acoustic pulses 112 and corresponding echoes 114. Further detail regarding the implementation of block 912 is provided below in connection with FIG. 11.

At block 914, the example echo profile analyzer 826 determines whether there are repeating reference signals in the echo profile. As described above, in some examples, the repeating reference signals (corresponding to the directly detected acoustic pulses 112) are identified when (1) the signals are detected at a consistent periodicity corresponding to the fixed interval defined in the acoustic pulse parameters, and (2) the intensity of the repeating signals satisfies a signal intensity threshold. If the example echo profile analyzer 826 does not identify repeating reference signals in the echo profile, no object detection can be performed. Accordingly, control advances to block 924 to determine whether to continue the process. However, if the example echo profile analyzer 826 determines that there are repeating reference signals in the echo profile, control advances to block 916.

At block 916, the example echo profile analyzer 826 determines whether there is an echo indicative of a nearby object in the echo profile. In some examples, such an echo is detected by identifying a signal peak in the echo profile that is a short time delay after a reference signal with an intensity that satisfies (e.g., exceeds) a valid echo threshold. If the example echo profile analyzer 826 does not identify such an echo, it is assumed that no object is in the detection region 116. Accordingly, control advances to block 924 to determine whether to continue the process. However, if the example echo profile analyzer 826 determines that there is an echo indicative of a nearby object in the echo profile, control advances to block 918.

At block 918, the example proximity calculator 824 calculates the distance of the object based on a time delay between the reference signals and the corresponding echoes 114 in the echo profile. In some examples, multiple distance calculations are performed for multiple successive echoes 114 associated with multiple successive reference signals. The multiple data points serve to increase the accuracy and reliability of the output. At block 920, the example proximity calculator 620 determines whether the distance of the object is within the activation region 116. If so, control advances to block 922 where the example activation operation controller 626 generates an output to initiate an operation on the computing device 100 associated with object being detected within the activation region. Thereafter, control advances to block 924. Returning to block 920, if the distance of the object is not within the activation region 116, control advances directly to block 924. At block 924, the example program determines whether to continue. If so, control returns to block 902. Otherwise, the example process of FIG. 9 ends.

FIG. 10 illustrates an example implementation of block 904 of FIG. 9 to set acoustic pulse parameters. The example process of FIG. 10 begins at block 1002 where the example microphone 104 captures audio in the environment surrounding computing device. At block 1004, the example frequency analyzer 804 converts the audio data to the frequency domain. At block 1006, the example frequency analyzer 804 determines a power level of noise in different frequency bands (e.g., the frequency bands 202, 204, 206, 208, 210). At block 1008, the example frequency selector 806 allocates each frequency band 202, 204, 206, 208, 210 into a noise power bin based on the corresponding power level of noise. At block 1010, the example frequency selector 806 identifies the lowest noise power bin allocated at least one frequency band 202, 204, 206, 208, 210.

At block 1012, the example frequency selector 806 determines whether there is more than one frequency band 202, 204, 206, 208, 210 allocated to the identified lowest noise power bin. That is, the example frequency selector 806 determines whether multiple frequency bands 202, 204, 206, 208, 210 are designated as equally suitable for the central frequency of the acoustic pulses 112. If there is not more than one frequency band 202, 204, 206, 208, 210 allocated to the identified lowest noise power bin, control advances to block 1014 where example frequency selector 806 selects a central frequency for the acoustic pulses 112 to be within the frequency band 202, 204, 206, 208, 210 allocated to the identified lowest noise power bin. In some examples, the central frequency for the acoustic pulses 112 is defined to be the center frequency of the selected frequency band 202, 204, 206, 208, 210. Thereafter, control advances to block 1020.

Returning to block 1012, if there is more than one frequency band 202, 204, 206, 208, 210 allocated to the identified lowest noise power bin, control advances to block 1016 where the example frequency selector 806 determines whether a threshold time has elapsed since the current central frequency of acoustic pulses was initially selected. If the threshold time has not elapsed, control advances to block 1020 without adjusting the central frequency for the acoustic pulses 112. However, if the threshold time has elapsed, control advances to block 1018 where the example frequency selector 806 selects a different central frequency for the acoustic pulses 112 corresponding to a different frequency band 202, 204, 206, 208, 210 allocated to the identified lowest noise power bin. In some examples, the frequency selector 806 cycles through each frequency band 202, 204, 206, 208, 210 allocated to the identified lowest noise power before selecting a previously selected frequency band 202, 204, 206, 208, 210. In some examples, the frequency selector 806 directly compares the level of noise in each of the frequency bands 202, 204, 206, 208, 210 to determine the frequency band 202, 204, 206, 208, 210 associated with the lowest amount of noise without reference to the noise power bins. In some such examples, blocks 1008-1018 may be omitted and the central frequency for the acoustic pulses 112 is selected to be within the frequency band with the lowest amount of noise. Regardless of whether the noise power bins are used in the analysis, once the central frequency for the acoustic pulses 112 has been selected, control advances to block 1020.

At block 1020, the example amplitude selector 808 sets the amplitude for the acoustic pulses 112 based on the noise level associated with the identified lowest noise power bin (or the noise level associated with the frequency band 202, 204, 206, 208, 210 having the lowest amount of noise). At block 1022, the example interval selector 810 sets the interval for the acoustic pulses 112. In some examples, the interval is configurable by a user and, therefore, may be set once and then remain unchanged thereafter. In such examples, block 1022 may be omitted. Additionally or alternatively, the example interval selector 810 may change the interval in response to changes to the power state of the computing device 100. Thereafter, the example process of FIG. 10 ends and returns to continue with the process of FIG. 9.

FIG. 11 illustrates an example implementation of block 912 of FIG. 9 to generate and/or update an echo profile based on the acoustic pulses 112 and corresponding echoes 114. The example process of FIG. 11 begins at block 1102 where the example signal filter analyzer 816 processes the captured audio data through a high pass filter. In some examples, the audio data is processed through a band pass filter to isolate frequencies specific to the frequency band 202, 204, 206, 208, 210 corresponding to the central frequency of the acoustic pulses 112 selected at either block 1014 or block 1018 of FIG. 10. At block 1104, the example signal smoothing analyzer 818 applies a signal smoothener to the filtered audio data. At block 1106, the example signal peak detector 820 identifies peaks in the processed signal. Thereafter, the example process of FIG. 11 ends and returns to continue with the process of FIG. 9.

Figure 12:
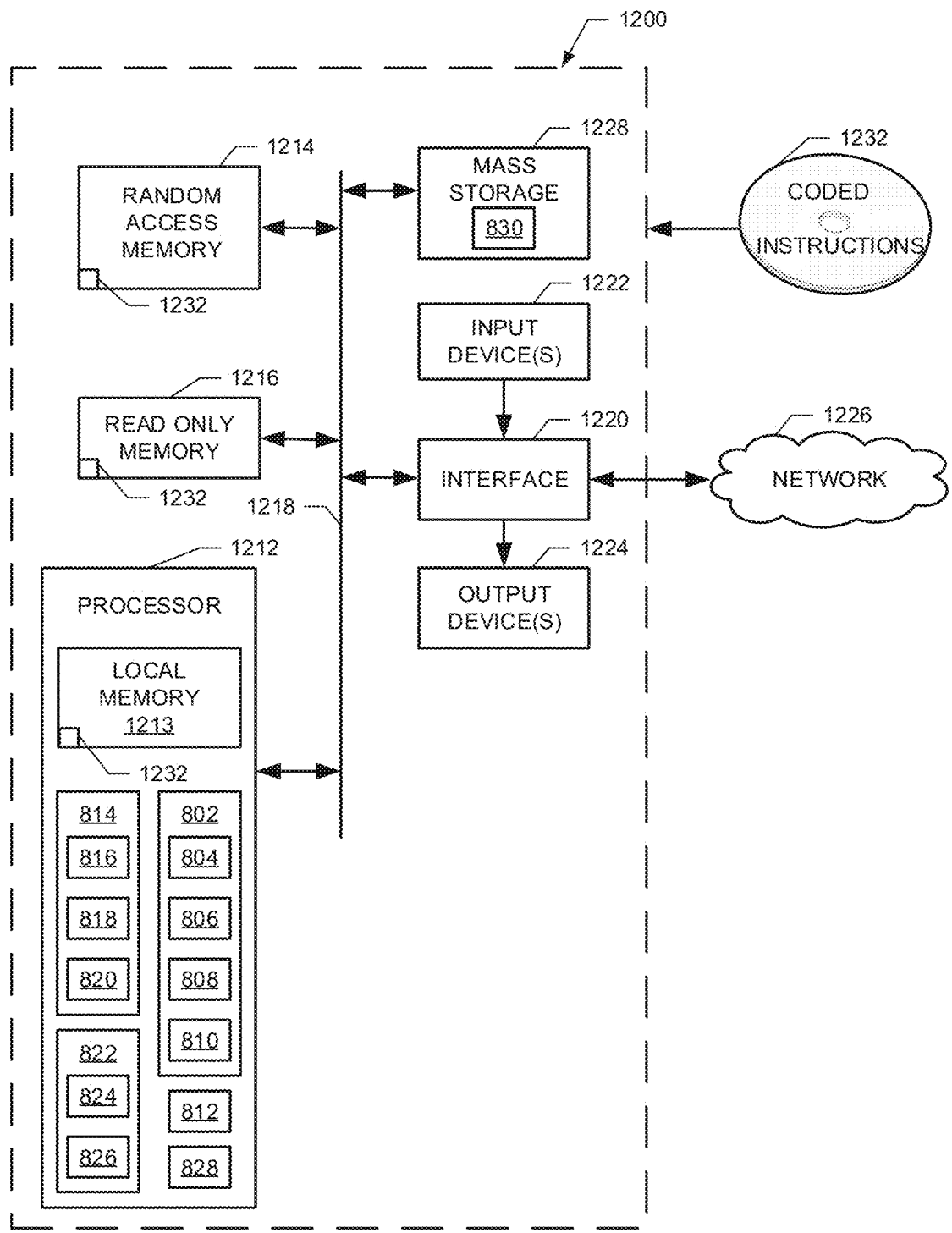
FIG. 12 is a block diagram of an example processing platform structured to execute the example instructions of FIGS. 9-11 to implement the example computing device of FIGS. 1 and/or 8.

FIG. 12 is a block diagram of an example processor platform 1200 structured to execute the instructions of FIGS. 9-11 to implement the computing device 100 of FIGS. 1 and/or 8. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a headset or other wearable device, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example acoustic pulse parameter generator 802, the example frequency analyzer 804, the example frequency selector 806, the example amplitude selector 808, the example interval selector 810, the example signal generator 812, the example echo profile generator 814, the example signal filter analyzer 816, the example signal smoothing analyzer 818, the example signal peak detector 820, the example object detection analyzer 822, the example proximity calculator 824, the example echo profile analyzer 826, and the example activation operation controller 828.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. The input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives. In this example, the mass storage device includes the example data store 830.

The machine executable instructions 1232 of FIGS. 9-11 may be stored in the mass storage device 1228, in the volatile memory 1214, in the non-volatile memory 1216, and/or on a removable non-transitory computer readable storage medium such as a CD or DVD.

Figure 13:
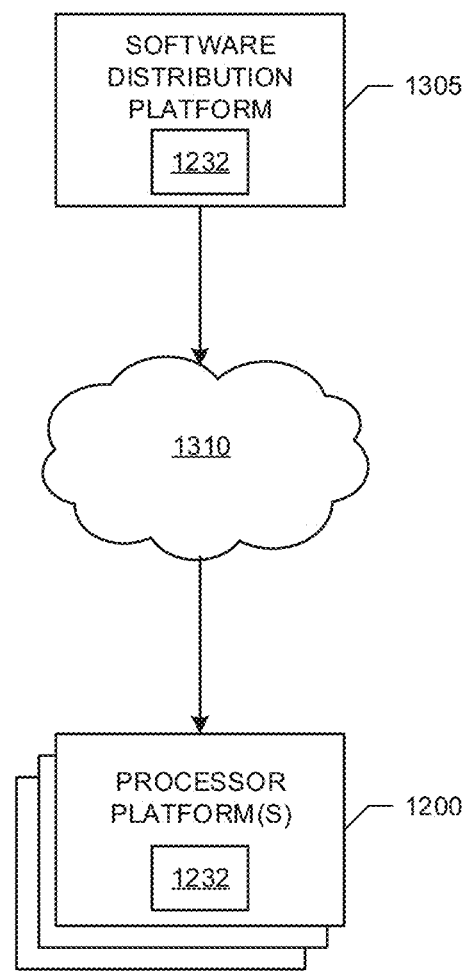
FIG. 13 is a block diagram of an example software distribution platform to distribute software (e.g., software corresponding to the example computer readable instructions of FIGS. 9-11) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1305 to distribute software such as the example computer readable instructions 1232 of FIG. 12 to third parties is illustrated in FIG. 13. The example software distribution platform 1305 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1232 of FIG. 12. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the computer readable instructions 1232, which may correspond to the example computer readable instructions of FIGS. 9-11, as described above. The one or more servers of the example software distribution platform 1305 are in communication with a network 1310, which may correspond to any one or more of the Internet and/or any of the example networks 1226 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 1232 from the software distribution platform 1305. For example, the software, which may correspond to the example computer readable instructions of FIG. 9-11, may be downloaded to the example processor platform 1200, which is to execute the computer readable instructions 1232 to implement the computing device 100. In some example, one or more servers of the software distribution platform 1305 periodically offer, transmit, and/or force updates to the software (e.g., the example computer readable instructions 1232 of FIG. 12) to ensure improvements, patches, updates, etc. are distributed and applied to the software at the end user devices.

From the foregoing, it will be appreciated that example methods, apparatus and articles of manufacture have been disclosed that enable the robust and error resilient detection of objects within the vicinity of a computing device based on near ultrasonic sound waves (e.g., at frequencies ranging between 14 kHz and 24 kHz) despite the presence of environmental noises that are common at such frequencies. Further, examples disclosed herein are able to achieve reliable results using standard speakers, microphones, and processing circuitry commonly used in many computing devices today, thereby reducing costs relative to other methodologies that require specialized components. Further, examples disclosed herein are more power efficient than other known methodologies, thereby enabling examples disclosed herein to be implemented on a computing device that is in a low power idle state or sleep state. The disclosed methods, apparatus and articles of manufacture improve the efficiency of using a computing device by dynamically adjusting the excitation frequency and amplitude of a signal used to generate acoustic pulses in response to measured noise levels in the environment surrounding the computing device. The disclosed methods, apparatus and articles of manufacture are accordingly directed to one or more improvement(s) in the functioning of a computer.

Example 1 includes an apparatus comprising a frequency analyzer to determine power levels of noise in different frequency bands associated with sound waves sensed by a microphone of a computing device, a signal generator to cause a speaker of the computing device to produce a series of acoustic pulses, a central frequency of the pulses defined based on the power levels of noise in the different frequency bands, the sound waves sensed by the microphone to include the pulses and echoes of the pulses reflected off objects in a vicinity of the computing device, and an object detection analyzer to determine whether a first object is within an activation region associated with the computing device based on the pulses and the echoes sensed by the microphone.

Example 2 includes the apparatus of example 1, further including a frequency selector to adjust the central frequency of the pulses based on a change in the power levels of noise in the different frequency bands.

Example 3 includes the apparatus of example 1, further including a frequency selector to identify a first frequency band of the different frequency bands having a lowest power level of noise relative to other ones of the different frequency bands, and define the central frequency to be within the first frequency band.

Example 4 includes the apparatus of example 1, further including a frequency selector to allocate each of the different frequency bands into corresponding ones of a plurality of noise power bins based on the power levels of noise associated with respective ones of the different frequency bands, identify a first noise power bin associated with a lowest power level of noise in which at least one of the different frequency bands is allocated, and define the central frequency to be within the at least one of the different frequency bands allocated to the first noise power bin.

Example 5 includes the apparatus of example 4, wherein the frequency selector is to allocate both a first frequency band and a second frequency band into the first noise power bin, define the central frequency to be within the first frequency band at a first point in time, and in response to a threshold period of time elapsing since the first point in time, adjust the central frequency to be within the second frequency band.

Example 6 includes the apparatus of example 1, further including an amplitude selector to adjust an amplitude of the pulses based on a change in the power levels of noise in the different frequency bands.

Example 7 includes the apparatus of example 1, further including a frequency selector to identify a first frequency band of the different frequency bands having a lowest power level of noise relative to other ones of the different frequency bands, and an amplitude selector to set an amplitude of the pulses based on the lowest power level of noise.

Example 8 includes the apparatus of example 7, wherein the amplitude selector to set the amplitude such that a power level of the pulses is a threshold above the lowest power level of noise.

Example 9 includes the apparatus of example 1, further including a frequency selector to allocate each of the different frequency bands into corresponding ones of a plurality of noise power bins based on the power levels of noise associated with respective ones of the different frequency bands, and identify a first noise power bin in which at least one of the different frequency bands is allocated and which is associated with a lowest power level of noise, and an amplitude selector to set an amplitude of the pulses based on the lowest power level of noise associated with the first noise power bin.

Example 10 includes the apparatus of example 1, wherein each of the different frequency bands corresponds to a different segment of a near ultrasonic frequency range.

Example 11 includes the apparatus of example 1, wherein the central frequency is to be between 14 kHz and 24 KHz.

Example 12 includes the apparatus of example 1, further including an activation operation controller to, in response to detection of the first object within the activation region, implement an operation in the computing device.

Example 13 includes a computing device comprising at least one memory storing instructions, and at least one processor to execute the instructions to determine power levels of noise in different frequency bands associated with sound waves sensed by a microphone of the computing device, cause a speaker of the computing device to produce a series of acoustic pulses, a central frequency of the pulses defined based on the power levels of noise in the different frequency bands, the sound waves sensed by the microphone to include the pulses and echoes of the pulses reflected off objects in a vicinity of the computing device, and determine whether a first object is within an activation region associated with the computing device based on the pulses and the echoes sensed by the microphone.

Example 14 includes the computing device of example 13, wherein the at least one processor is to execute the instructions to adjust the central frequency of the pulses based on a change in the power levels of noise in the different frequency bands.

Example 15 includes the computing device of example 13, wherein the at least one processor is to execute the instructions to identify a first frequency band of the different frequency bands having a lowest power level of noise relative to other ones of the different frequency bands, and define the central frequency to be within the first frequency band.

Example 16 includes the computing device of example 13, wherein the at least one processor is to execute the instructions to allocate each of the different frequency bands into corresponding ones of a plurality of noise power bins based on the power levels of noise associated with respective ones of the different frequency bands, identify a first noise power bin associated with a lowest power level of noise in which at least one of the different frequency bands is allocated, and define the central frequency to be within the at least one of the different frequency bands allocated to the first noise power bin.

Example 17 includes the computing device of example 16, wherein the at least one processor is to execute the instructions to allocate both a first frequency band and a second frequency band into the first noise power bin, define the central frequency to be within the first frequency band at a first point in time, and in response to a threshold period of time elapsing since the first point in time, adjust the central frequency to be within the second frequency band.

Example 18 includes the computing device of example 13, wherein the at least one processor is to execute the instructions to adjust an amplitude of the pulses based on a change in the power levels of noise in the different frequency bands.

Example 19 includes the computing device of example 13, wherein the at least one processor is to execute the instructions to identify a first frequency band of the different frequency bands having a lowest power level of noise relative to other ones of the different frequency bands, and set an amplitude of the pulses based on the lowest power level of noise.

Example 20 includes the computing device of example 19, wherein the at least one processor is to execute the instructions to set the amplitude such that a power level of the pulses is a threshold above the lowest power level of noise.

Example 21 includes the computing device of example 13, wherein the at least one processor is to execute the instructions to allocate each of the different frequency bands into corresponding ones of a plurality of noise power bins based on the power levels of noise associated with respective ones of the different frequency bands, identify a first noise power bin in which at least one of the different frequency bands is allocated and which is associated with a lowest power level of noise, and set an amplitude of the pulses based on the lowest power level of noise associated with the first noise power bin.

Example 22 includes the computing device of example 13, wherein each of the different frequency bands corresponds to a different segment of a near ultrasonic frequency range.

Example 23 includes the computing device of example 13, wherein the central frequency is to be between 14 kHz and 24 KHz.

Example 24 includes the computing device of example 13, wherein the at least one processor is to execute the instructions to, in response to detection of the first object within the activation region, implement an operation in the computing device.

Example 25 includes a non-transitory computer readable medium comprising instructions that, when executed, cause at least one processor to at least determine power levels of noise in different frequency bands associated with sound waves sensed by a microphone of a computing device, cause a speaker of the computing device to produce a series of acoustic pulses, a central frequency of the pulses defined based on the power levels of noise in the different frequency bands, the sound waves sensed by the microphone to include the pulses and echoes of the pulses reflected off objects in a vicinity of the computing device, and determine whether a first object is within an activation region associated with the computing device based on the pulses and the echoes sensed by the microphone.

Example 26 includes the non-transitory computer readable medium of example 25, wherein the instructions cause the at least one processor to adjust the central frequency of the pulses based on a change in the power levels of noise in the different frequency bands.

Example 27 includes the non-transitory computer readable medium of example 25, wherein the instructions cause the at least one processor to identify a first frequency band of the different frequency bands having a lowest power level of noise relative to other ones of the different frequency bands, and define the central frequency to be within the first frequency band.

Example 28 includes the non-transitory computer readable medium of example 25, wherein the instructions cause the at least one processor to allocate each of the different frequency bands into corresponding ones of a plurality of noise power bins based on the power levels of noise associated with respective ones of the different frequency bands, identify a first noise power bin associated with a lowest power level of noise in which at least one of the different frequency bands is allocated, and define the central frequency to be within the at least one of the different frequency bands allocated to the first noise power bin.

Example 29 includes the non-transitory computer readable medium of example 28, wherein the instructions cause the at least one processor to allocate both a first frequency band and a second frequency band into the first noise power bin, define the central frequency to be within the first frequency band at a first point in time, and in response to a threshold period of time elapsing since the first point in time, adjust the central frequency to be within the second frequency band.

Example 30 includes the non-transitory computer readable medium of example 25, wherein the instructions cause the at least one processor to adjust an amplitude of the pulses based on a change in the power levels of noise in the different frequency bands.

Example 31 includes the non-transitory computer readable medium of example 25, wherein the instructions cause the at least one processor to identify a first frequency band of the different frequency bands having a lowest power level of noise relative to other ones of the different frequency bands, and set an amplitude of the pulses based on the lowest power level of noise.

Example 32 includes the non-transitory computer readable medium of example 31, wherein the instructions cause the at least one processor to set the amplitude such that a power level of the pulses is a threshold above the lowest power level of noise.

Example 33 includes the non-transitory computer readable medium of example 25, wherein the instructions cause the at least one processor to allocate each of the different frequency bands into corresponding ones of a plurality of noise power bins based on the power levels of noise associated with respective ones of the different frequency bands, identify a first noise power bin in which at least one of the different frequency bands is allocated and which is associated with a lowest power level of noise, and set an amplitude of the pulses based on the lowest power level of noise associated with the first noise power bin.

Example 34 includes the non-transitory computer readable medium of example 25, wherein each of the different frequency bands corresponds to a different segment of a near ultrasonic frequency range.

Example 35 includes the non-transitory computer readable medium of example 25, wherein the central frequency is to be between 14 kHz and 24 KHz.

Example 36 includes the non-transitory computer readable medium of example 25, wherein the instructions cause the at least one processor to, in response to detection of the first object within the activation region, implement an operation in the computing device.

Example 37 includes a method comprising determining power levels of noise in different frequency bands associated with sound waves sensed by a microphone of a computing device, producing, with a speaker of the computing device, a series of acoustic pulses, a central frequency of the pulses defined based on the power levels of noise in the different frequency bands, the sound waves sensed by the microphone to include the pulses and echoes of the pulses reflected off objects in a vicinity of the computing device, and determining whether a first object is within an activation region associated with the computing device based on the pulses and the echoes sensed by the microphone.

Example 38 includes the method of example 37, further including adjusting the central frequency of the pulses based on a change in the power levels of noise in the different frequency bands.

Example 39 includes the method of example 37, further including identifying a first frequency band of the different frequency bands having a lowest power level of noise relative to other ones of the different frequency bands, and defining the central frequency to be within the first frequency band.

Example 40 includes the method of example 37, further including allocating each of the different frequency bands into corresponding ones of a plurality of noise power bins based on the power levels of noise associated with respective ones of the different frequency bands, identifying a first noise power bin associated with a lowest power level of noise in which at least one of the different frequency bands is allocated, and defining the central frequency to be within the at least one of the different frequency bands allocated to the first noise power bin.

Example 41 includes the method of example 40, further including allocating both a first frequency band and a second frequency band into the first noise power bin, defining the central frequency to be within the first frequency band at a first point in time, and in response to a threshold period of time elapsing since the first point in time, adjusting the central frequency to be within the second frequency band.

Example 42 includes the method of example 37, further including adjusting an amplitude of the pulses based on a change in the power levels of noise in the different frequency bands.

Example 43 includes the method of example 37, further including identifying a first frequency band of the different frequency bands having a lowest power level of noise relative to other ones of the different frequency bands, and setting an amplitude of the pulses based on the lowest power level of noise.

Example 44 includes the method of example 43, wherein the setting of the amplitude includes setting the amplitude such that a power level of the pulses is a threshold above the lowest power level of noise.

Example 45 includes the method of example 37, further including allocating each of the different frequency bands into corresponding ones of a plurality of noise power bins based on the power levels of noise associated with respective ones of the different frequency bands, identifying a first noise power bin in which at least one of the different frequency bands is allocated and which is associated with a lowest power level of noise, and setting an amplitude of the pulses based on the lowest power level of noise associated with the first noise power bin.

Example 46 includes the method of example 37, wherein each of the different frequency bands corresponds to a different segment of a near ultrasonic frequency range.

Example 47 includes the method of example 37, wherein the central frequency is to be between 14 kHz and 24 KHz.

Example 48 includes the method of example 37, further including, in response to detection of the first object within the activation region, implementing an operation in the computing device.

Example 49 includes an apparatus comprising means for determining power levels of noise in different frequency bands associated with sound waves sensed by a microphone of a computing device, means for producing a series of acoustic pulses, a central frequency of the pulses defined based on the power levels of noise in the different frequency bands, the sound waves sensed by the microphone to include the pulses and echoes of the pulses reflected off objects in a vicinity of the computing device, and means for detecting whether a first object is within an activation region associated with the computing device based on the pulses and the echoes sensed by the microphone.

Example 50 includes the apparatus of example 49, further including means for selecting the central frequency, the central frequency selecting means to adjust the central frequency of the pulses based on a change in the power levels of noise in the different frequency bands.

Example 51 includes the apparatus of example 49, further including means for selecting the central frequency, the central frequency selecting means to identify a first frequency band of the different frequency bands having a lowest power level of noise relative to other ones of the different frequency bands, and define the central frequency to be within the first frequency band.

Example 52 includes the apparatus of example 49, further including means for selecting the central frequency, the central frequency selecting means to allocate each of the different frequency bands into corresponding ones of a plurality of noise power bins based on the power levels of noise associated with respective ones of the different frequency bands, identify a first noise power bin associated with a lowest power level of noise in which at least one of the different frequency bands is allocated, and define the central frequency to be within the at least one of the different frequency bands allocated to the first noise power bin.

Example 53 includes the apparatus of example 52, wherein the central frequency selecting means is to allocate both a first frequency band and a second frequency band into the first noise power bin, define the central frequency to be within the first frequency band at a first point in time, and in response to a threshold period of time elapsing since the first point in time, adjust the central frequency to be within the second frequency band.

Example 54 includes the apparatus of example 49, further including means for setting an amplitude of the pulses, the amplitude setting means to adjust an amplitude of the pulses based on a change in the power levels of noise in the different frequency bands.

Example 55 includes the apparatus of example 49, further including means for selecting the central frequency, the central frequency selecting means to identify a first frequency band of the different frequency bands having a lowest power level of noise relative to other ones of the different frequency bands, and means for setting an amplitude of the pulses based on the lowest power level of noise.

Example 56 includes the apparatus of example 55, wherein the amplitude setting means is to set the amplitude such that a power level of the pulses is a threshold above the lowest power level of noise.

Example 57 includes the apparatus of example 49, further including means for selecting the central frequency, the central frequency selecting means to allocate each of the different frequency bands into corresponding ones of a plurality of noise power bins based on the power levels of noise associated with respective ones of the different frequency bands, and identify a first noise power bin in which at least one of the different frequency bands is allocated and which is associated with a lowest power level of noise, and means for setting an amplitude of the pulses based on the lowest power level of noise associated with the first noise power bin.

Example 58 includes the apparatus of example 49, wherein each of the different frequency bands corresponds to a different segment of a near ultrasonic frequency range.

Example 59 includes the apparatus of example 49, wherein the central frequency is to be between 14 kHz and 24 KHz.

Example 60 includes the apparatus of example 49, further including means for implementing an operation in the computing device in response to detection of the first object within the activation region.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:
1. An apparatus comprising:
a frequency analyzer to determine power levels of noise in different frequency bands associated with sound waves sensed by a microphone of a computing device:
a signal generator to cause a speaker of the computing device to produce a series of acoustic pulses, a central frequency of the pulses defined based on the power levels of noise in the different frequency bands, the sound waves sensed by the microphone to include the pulses and echoes of the pulses reflected off objects in a vicinity of the computing device; and
an object detection analyzer to determine whether a first object is within an activation region associated with the computing device based on the pulses and the echoes sensed by the microphone.

2. The apparatus of claim 1, further including a frequency selector to adjust the central frequency of the pulses based on a change in the power levels of noise in the different frequency bands.

3. The apparatus of claim 1, further including a frequency selector to:
identify a first frequency band of the different frequency bands having a lowest power level of noise relative to other ones of the different frequency bands; and
define the central frequency to be within the first frequency band.

4. The apparatus of claim 1, further including a frequency selector to:
allocate each of the different frequency bands into corresponding ones of a plurality of noise power bins based on the power levels of noise associated with respective ones of the different frequency bands;
identify a first noise power bin associated with a lowest power level of noise in which at least one of the different frequency bands is allocated; and
define the central frequency to be within the at least one of the different frequency bands allocated to the first noise power bin.

5. The apparatus of claim 4, wherein the frequency selector is to:
allocate both a first frequency band and a second frequency band into the first noise power bin;
define the central frequency to be within the first frequency band at a first point in time; and
in response to a threshold period of time elapsing since the first point in time, adjust the central frequency to be within the second frequency band.

6. The apparatus of claim 1, further including an amplitude selector to adjust an amplitude of the pulses based on a change in the power levels of noise in the different frequency bands.

7. The apparatus of claim 1, further including:
a frequency selector to identify a first frequency band of the different frequency bands having a lowest power level of noise relative to other ones of the different frequency bands; and
an amplitude selector to set an amplitude of the pulses based on the lowest power level of noise.

8. The apparatus of claim 7, wherein the amplitude selector is to set the amplitude such that a power level of the pulses is a threshold above the lowest power level of noise.

9. The apparatus of claim 1, further including:
a frequency selector to:
allocate each of the different frequency bands into corresponding ones of a plurality of noise power bins based on the power levels of noise associated with respective ones of the different frequency bands; and
identify a first noise power bin in which at least one of the different frequency bands is allocated and which is associated with a lowest power level of noise; and
an amplitude selector to set an amplitude of the pulses based on the lowest power level of noise associated with the first noise power bin.

10. The apparatus of claim 1, wherein each of the different frequency bands corresponds to a different segment of a near ultrasonic frequency range.

11. The apparatus of claim 1, wherein the central frequency is to be between 14 kHz and 24 KHz.

12. The apparatus of claim 1, further including an activation operation controller to, in response to detection of the first object within the activation region, implement an operation in the computing device.

13. A computing device comprising:
at least one memory storing instructions; and
at least one processor to execute the instructions to:
determine power levels of noise in different frequency bands associated with sound waves sensed by a microphone of the computing device:
cause a speaker of the computing device to produce a series of acoustic pulses, a central frequency of the pulses defined based on the power levels of noise in the different frequency bands, the sound waves sensed by the microphone to include the pulses and echoes of the pulses reflected off objects in a vicinity of the computing device; and
determine whether a first object is within an activation region associated with the computing device based on the pulses and the echoes sensed by the microphone.

14. The computing device of claim 13, wherein the at least one processor is to execute the instructions to adjust the central frequency of the pulses based on a change in the power levels of noise in the different frequency bands.

15. The computing device of claim 13, wherein the at least one processor is to execute the instructions to:
identify a first frequency band of the different frequency bands having a lowest power level of noise relative to other ones of the different frequency bands; and
define the central frequency to be within the first frequency band.

16. The computing device of claim 13, wherein the at least one processor is to execute the instructions to:
allocate each of the different frequency bands into corresponding ones of a plurality of noise power bins based on the power levels of noise associated with respective ones of the different frequency bands:
identify a first noise power bin associated with a lowest power level of noise in which at least one of the different frequency bands is allocated; and
define the central frequency to be within the at least one of the different frequency bands allocated to the first noise power bin.

17. A non-transitory computer readable medium comprising instructions that, when executed, cause at least one processor to at least:
determine power levels of noise in different frequency bands associated with sound waves sensed by a microphone of a computing device:
cause a speaker of the computing device to produce a series of acoustic pulses, a central frequency of the pulses defined based on the power levels of noise in the different frequency bands, the sound waves sensed by the microphone to include the pulses and echoes of the pulses reflected off objects in a vicinity of the computing device; and
determine whether a first object is within an activation region associated with the computing device based on the pulses and the echoes sensed by the microphone.

18. The non-transitory computer readable medium of claim 17, wherein the instructions cause the at least one processor to adjust the central frequency of the pulses based on a change in the power levels of noise in the different frequency bands.

19. The non-transitory computer readable medium of claim 17, wherein the instructions cause the at least one processor to:
identify a first frequency band of the different frequency bands having a lowest power level of noise relative to other ones of the different frequency bands; and define the central frequency to be within the first frequency band.

20. The non-transitory computer readable medium of claim 17, wherein the instructions cause the at least one processor to:
allocate each of the different frequency bands into corresponding ones of a plurality of noise power bins based on the power levels of noise associated with respective ones of the different frequency bands:
identify a first noise power bin associated with a lowest power level of noise in which at least one of the different frequency bands is allocated; and
define the central frequency to be within the at least one of the different frequency bands allocated to the first noise power bin.

21. The non-transitory computer readable medium of claim 20, wherein the instructions cause the at least one processor to:
allocate both a first frequency band and a second frequency band into the first noise power bin;
define the central frequency to be within the first frequency band at a first point in time; and
in response to a threshold period of time elapsing since the first point in time, adjust the central frequency to be within the second frequency band.

22. The non-transitory computer readable medium of claim 17, wherein the instructions cause the at least one processor to adjust an amplitude of the pulses based on a change in the power levels of noise in the different frequency bands.

23. The non-transitory computer readable medium of claim 17, wherein the instructions cause the at least one processor to:
- identify a first frequency band of the different frequency bands having a lowest power level of noise relative to other ones of the different frequency bands; and
- set an amplitude of the pulses based on the lowest power level of noise.

24. The non-transitory computer readable medium of claim 23, wherein the instructions cause the at least one processor to set the amplitude such that a power level of the pulses is a threshold above the lowest power level of noise.

* * * * *